US012633097B2

(12) United States Patent
Tachibana

(10) Patent No.: US 12,633,097 B2
(45) Date of Patent: May 19, 2026

(54) INFORMATION PROCESSING APPARATUS, METHOD OF OPERATING INFORMATION PROCESSING APPARATUS, AND PROGRAM FOR OPERATING INFORMATION PROCESSING APPARATUS

(71) Applicant: FUJIFILM Corporation, Tokyo (JP)

(72) Inventor: Atsushi Tachibana, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 275 days.

(21) Appl. No.: 18/473,292

(22) Filed: Sep. 25, 2023

(65) Prior Publication Data
US 2024/0013524 A1 Jan. 11, 2024

Related U.S. Application Data

(63) Continuation of application No. PCT/JP2022/008071, filed on Feb. 25, 2022.

(30) Foreign Application Priority Data

Mar. 31, 2021 (JP) ................................ 2021-061524

(51) Int. Cl.
*G06V 10/776* (2022.01)
*G06V 20/70* (2022.01)
*G06V 10/774* (2022.01)
(52) U.S. Cl.
CPC ............ *G06V 10/776* (2022.01); *G06V 20/70* (2022.01); *G06V 10/774* (2022.01); *G06V 2201/03* (2022.01)

(58) Field of Classification Search
USPC ......................................................... 382/128
See application file for complete search history.

(56) References Cited

U.S. PATENT DOCUMENTS

2020/0152316 A1 5/2020 Lee et al.
2020/0160981 A1 5/2020 Masubuchi et al.
2020/0210926 A1 7/2020 Lee et al.
(Continued)

FOREIGN PATENT DOCUMENTS

JP 2015162109 9/2015
JP 2019146936 9/2019
(Continued)

OTHER PUBLICATIONS

"International Search Report (Form PCT/ISA/210) of PCT/JP2022/008071", mailed on May 17, 2022, with English translation thereof, pp. 1-5.
(Continued)

*Primary Examiner* — Jacky X Zheng
(74) *Attorney, Agent, or Firm* — JCIPRNET

(57) ABSTRACT

An information processing apparatus includes a processor, in which the processor acquires, when an annotator generates annotation information as correct answer data of a machine learning model for analyzing a medical image, reference history information by the annotator of related medical information related to a generation source medical image that is a generation source of the annotation information, and derives evaluation information representing quality of the annotation information based on the reference history information.

11 Claims, 23 Drawing Sheets

(56)                   References Cited

U.S. PATENT DOCUMENTS

2021/0019580 A1 *    1/2021   Sakane  ..............  G06V 30/1916
2022/0101984 A1 *    3/2022   Park  ...................... A61B 5/0013
2023/0335259 A1     10/2023   Lee et al.
2025/0132021 A1      4/2025   Lee et al.

FOREIGN PATENT DOCUMENTS

JP          2019146936  A   *   9/2019
JP          2020086519          6/2020
JP          2021502652          1/2021
JP          2021018459          2/2021
JP          2021039748          3/2021

OTHER PUBLICATIONS

"Written Opinion of the International Searching Authority (Form
PCT/ISA/237) of PCT/JP2022/008071", mailed on May 17, 2022,
with English translation thereof, pp. 1-8.
"Notice of Reasons for Refusal of Japan Counterpart Application",
issued on Jan. 27, 2026, with English translation thereof, p. 1-p. 9.

* cited by examiner

*FIG. 11*

| 80A | RELATED MEDICAL INFORMATION |
| --- | --- |
| 22 | DIFFERENT-APPARATUS MEDICAL IMAGE |

| 80B | RELATED MEDICAL INFORMATION |
| --- | --- |
| 81 | DIFFERENT-DATE-AND-TIME MEDICAL IMAGE |

| 80C | RELATED MEDICAL INFORMATION |
| --- | --- |
| 82 | SAMPLE INSPECTION DATA |

| 80D | RELATED MEDICAL INFORMATION |
| --- | --- |
| 83 | PATHOLOGICAL DIAGNOSIS RESULT |

| 80E | RELATED MEDICAL INFORMATION |
| --- | --- |
| 84 | CAD PROCESSING RESULT |

REFERENCE HISTORY INFORMATION

DIFFERENT-APPARATUS MEDICAL IMAGE: REFERENCED
DIFFERENT-DATE-AND-TIME MEDICAL IMAGE: NOT REFERENCED
SAMPLE INSPECTION DATA: NOT REFERENCED
PATHOLOGICAL DIAGNOSIS RESULT: REFERENCED
CAD PROCESSING RESULT: NOT REFERENCED

91

| NUMBER OF PIECES OF RELATED MEDICAL INFORMATION REFERRED TO | EVALUATION LEVEL |
|---|---|
| 4,5 | 4 |
| 2,3 | 3 |
| 1 | 2 |
| 0 | 1 |

GOOD QUALITY

BAD QUALITY

92

EVALUATION INFORMATION

REFERENCE HISTORY INFORMATION

DIFFERENT-APPARATUS MEDICAL IMAGE: REFERENCED
DIFFERENT-DATE-AND-TIME MEDICAL IMAGE: NOT REFERENCED
SAMPLE INSPECTION DATA: NOT REFERENCED
PATHOLOGICAL DIAGNOSIS RESULT: REFERENCED
CAD PROCESSING RESULT: NOT REFERENCED

100

OPERATION HISTORY INFORMATION

ENLARGEMENT OPERATION OF
GENERATION SOURCE MEDICAL IMAGE: PERFORMED
DISPLAY GRADATION CHANGE OPERATION OF
GENERATION SOURCE MEDICAL IMAGE: PERFORMED

101

| NUMBER OF PIECES OF RELATED MEDICAL INFORMATION REFERRED TO +NUMBER OF OPERATIONS PERFORMED | EVALUATION LEVEL | |
|---|---|---|
| 6, 7 | 4 | GOOD QUALITY |
| 4, 5 | 3 | |
| 2, 3 | 2 | |
| 0, 1 | 1 | BAD QUALITY |

102

EVALUATION INFORMATION

Figure 15:
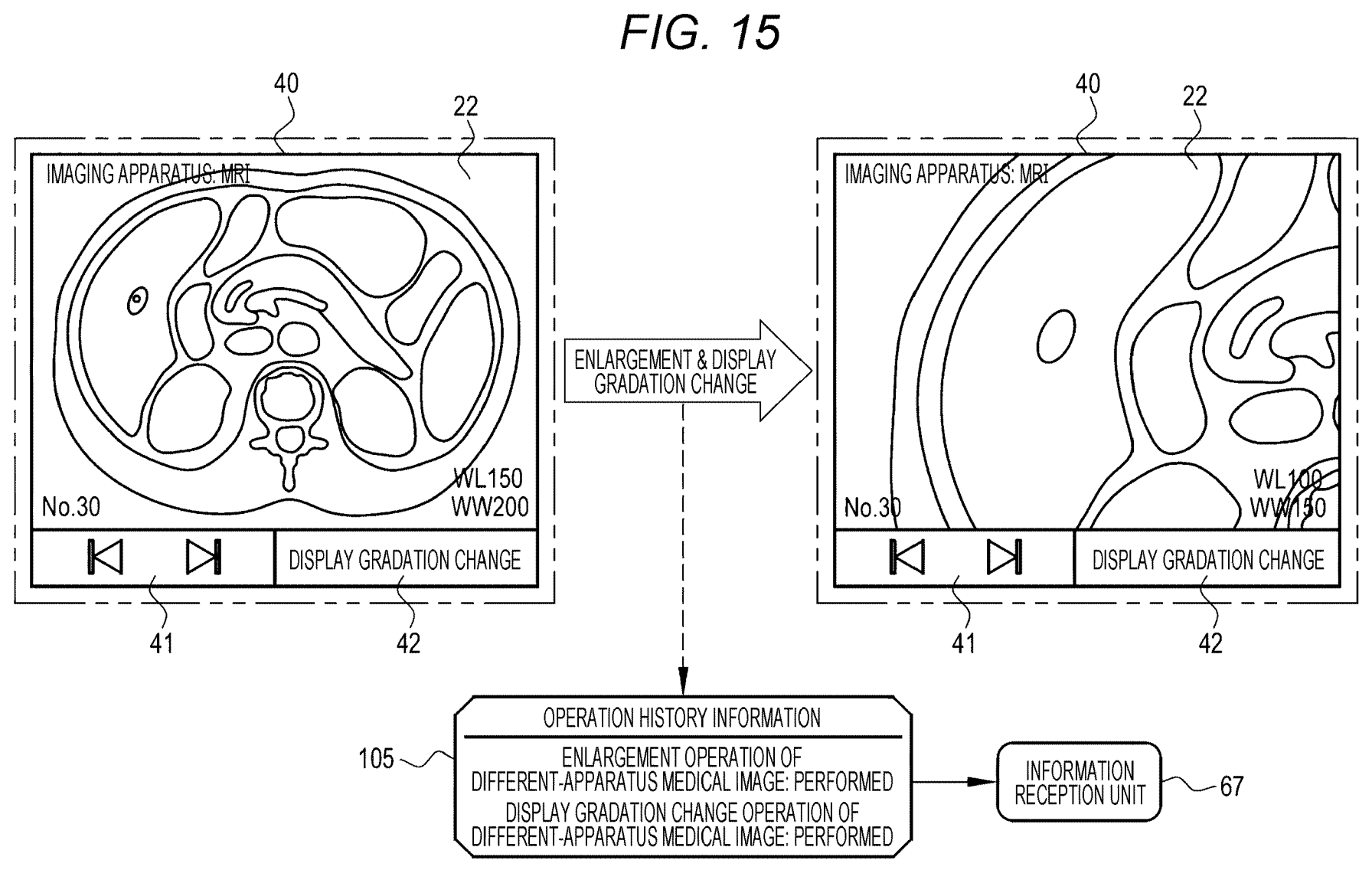

IMAGING APPARATUS: MRI

WL100
WW150

No.30    41    42    DISPLAY GRADATION CHANGE

⇑ ENLARGEMENT & DISPLAY GRADATION CHANGE

22

40

IMAGING APPARATUS: MRI

WL150
WW200

No.30    41    42    DISPLAY GRADATION CHANGE

OPERATION HISTORY INFORMATION

ENLARGEMENT OPERATION OF
DIFFERENT-APPARATUS MEDICAL IMAGE: PERFORMED
DISPLAY GRADATION CHANGE OPERATION OF
DIFFERENT-APPARATUS MEDICAL IMAGE: PERFORMED

105

INFORMATION
RECEPTION UNIT

Figure 17:
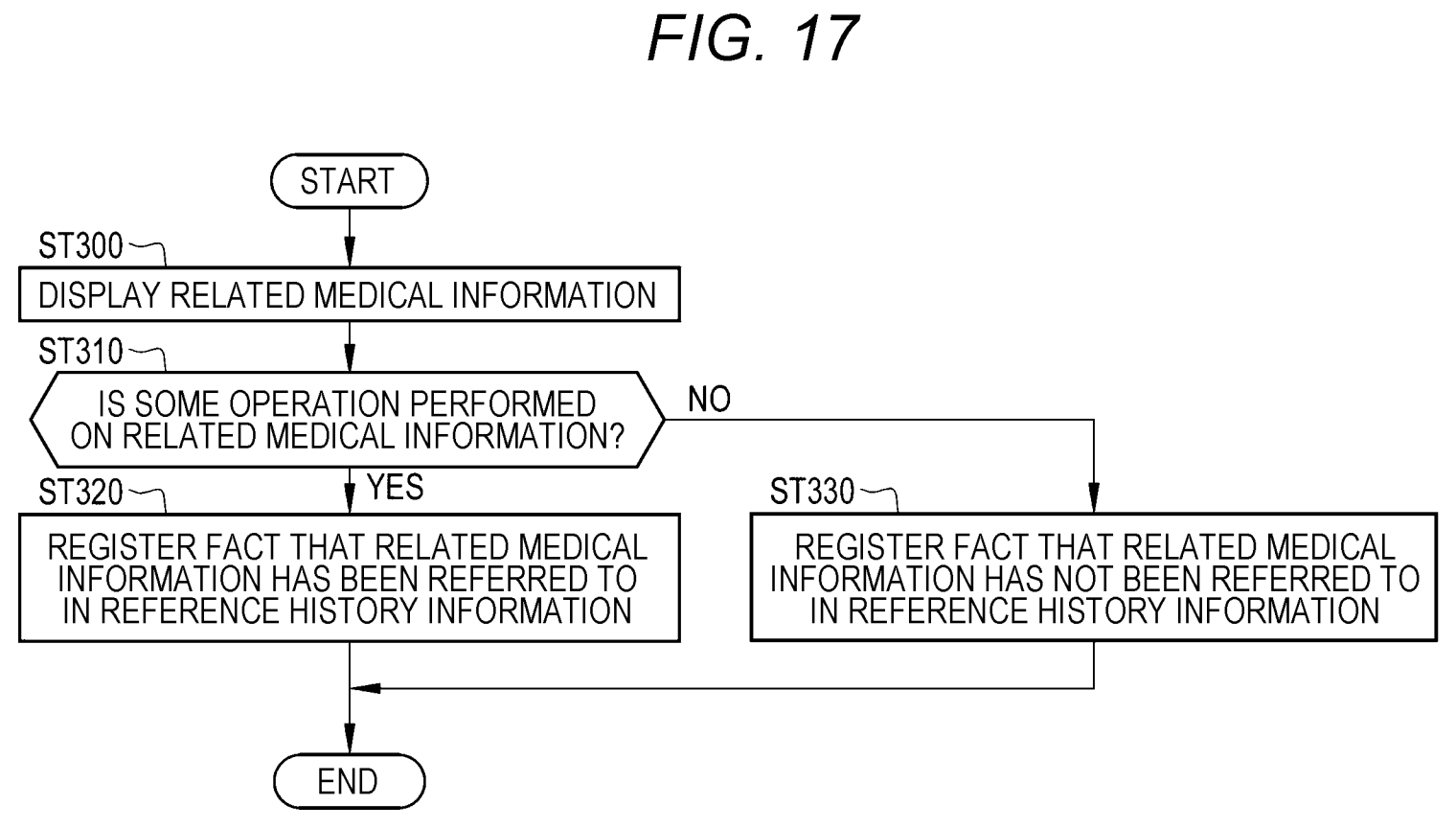

START

ST300 — DISPLAY RELATED MEDICAL INFORMATION

ST310 — IS SOME OPERATION PERFORMED ON RELATED MEDICAL INFORMATION?

YES

ST320 — REGISTER FACT THAT RELATED MEDICAL INFORMATION HAS BEEN REFERRED TO IN REFERENCE HISTORY INFORMATION

NO

ST330 — REGISTER FACT THAT RELATED MEDICAL INFORMATION HAS NOT BEEN REFERRED TO IN REFERENCE HISTORY INFORMATION

END

| EVALUATION SUMMARY | | | | | |
|---|---|---|---|---|---|
| ENTIRE ANNOTATION INFORMATION | | | ANNOTATION INFORMATION GENERATED BY YOU | | |
| EVALUATION LEVEL | NUMBER | RATIO | EVALUATION LEVEL | NUMBER | RATIO |
| 4 | 51 | 26% | 4 | 16 | 47% |
| 3 | 103 | 52% | 3 | 13 | 38% |
| 2 | 35 | 18% | 2 | 3 | 9% |
| 1 | 9 | 4% | 1 | 2 | 6% |

171
172

CONFIRMATION

173

| INDIVIDUAL SUMMARY INFORMATION | | |
|---|---|---|
| EVALUATION LEVEL | NUMBER | ADOPTION OR REJECTION TO CORRECT ANSWER DATA |
| 4 | 5 | ADOPTED |
| 3 | 13 | ADOPTED |
| 2 | 3 | NOT ADOPTED |
| 1 | 2 | NOT ADOPTED |

175

EVALUATION SUMMARY

ENTIRE ANNOTATION INFORMATION

| EVALUATION LEVEL | NUMBER | RATIO |
|---|---|---|
| 4 | 51 | 26% |
| 3 | 103 | 52% |
| 2 | 35 | 18% |
| 1 | 9 | 4% |

ANNOTATION INFORMATION GENERATED BY YOU

| EVALUATION LEVEL | NUMBER | RATIO | ADOPTION OR REJECTION TO CORRECT ANSWER DATA |
|---|---|---|---|
| 4 | 16 | 47% | ADOPTED |
| 3 | 13 | 38% | ADOPTED |
| 2 | 3 | 9% | NOT ADOPTED |
| 1 | 2 | 6% | NOT ADOPTED |
| | | ADOPTION RATE | 85% |

CONFIRMATION

INFORMATION PROCESSING APPARATUS, METHOD OF OPERATING INFORMATION PROCESSING APPARATUS, AND PROGRAM FOR OPERATING INFORMATION PROCESSING APPARATUS

CROSS-REFERENCE TO RELATED APPLICATIONS

This application is a continuation application of International Application No. PCT/JP2022/008071 filed on Feb. 25, 2022, the disclosure of which is incorporated herein by reference in its entirety. Further, this application claims priority from Japanese Patent Application No. 2021-061524 filed on Mar. 31, 2021, the disclosure of which is incorporated herein by reference in its entirety.

BACKGROUND

1. Technical Field

The present invention relates to an information processing apparatus, a method of operating the information processing apparatus, and a program for operating the information processing apparatus.

2. Description of the Related Art

For example, a machine learning model for analyzing a medical image, such as recognizing a tumor in an abdominal tomographic image captured by a computed tomography (CT) apparatus in units of pixels, has been developed. In such a machine learning model, annotation information as correct answer data is required in a learning phase or an accuracy evaluation phase. The annotation information is, for example, information generated by assigning a label according to a class that is an object to be recognized to an original medical image paired in the correct answer data. In an example of the abdominal tomographic image, the annotation information is information generated by assigning a label "tumor" to a pixel of the tumor in the abdominal tomographic image which is the original medical image.

JP2020-086519A discloses a medical image processing apparatus including an acquisition unit that acquires teacher data (correct answer data) regarding a medical image, and a reliability assigning unit that assigns reliability information based on one or both of a creation status (time required for creation, confidence level for an assigned label, or the like) of the teacher data and information (years of experience, qualification, busyness, or the like) regarding a creator who created the teacher data to the teacher data acquired by the acquisition unit.

JP2015-162109A describes a task assignment server that assignments a new task via a network to an expert among a group of workers capable of processing the new task, the task assignment server including a worker data base (DB) that stores worker group information including at least information of tasks processed in the past by each worker of the group of workers, a cluster creation functional unit that classifies each worker of the group of workers into any of a plurality of clusters based on the worker group information, and a processing result analysis functional unit that designates a worker belonging to one of the plurality of clusters as an expert based on a processing result of a test task that is a part of the new task.

SUMMARY

An embodiment according to the technique of the present disclosure provides an information processing apparatus, a method of operating an information processing apparatus, and a program for operating an information processing apparatus capable of more accurately evaluating quality of annotation information.

An information processing apparatus according to an aspect of the present disclosure comprises a processor, in which the processor acquires, when an annotator generates annotation information as correct answer data of a machine learning model for analyzing a medical image, reference history information by the annotator of related medical information related to a generation source medical image that is a generation source of the annotation information, and derives evaluation information representing quality of the annotation information based on the reference history information.

A method of operating an information processing apparatus according to the present disclosure, the method comprising: acquiring, when an annotator generates annotation information as correct answer data of a machine learning model for analyzing a medical image, reference history information by the annotator of related medical information related to a generation source medical image that is a generation source of the annotation information; and deriving evaluation information representing quality of the annotation information based on the reference history information.

A program for operating an information processing apparatus according to the present disclosure, the program causing a computer to execute processing of: acquiring, when an annotator generates annotation information as correct answer data of a machine learning model for analyzing a medical image, reference history information by the annotator of related medical information related to a generation source medical image that is a generation source of the annotation information; and deriving evaluation information representing quality of the annotation information based on the reference history information.

BRIEF DESCRIPTION OF THE DRAWINGS

Exemplary embodiments according to the technique of the present disclosure will be described in detail based on the following figures, wherein:

FIG. 11 is a diagram illustrating five types of related medical information;

FIG. 12 is a diagram illustrating a second embodiment in which evaluation information is derived according to the number of pieces of related medical information referred to by an annotator among the five types of related medical information;

FIG. 14 is a diagram illustrating a third_1 embodiment in which evaluation information is derived on the basis of operation history information in addition to reference history information;

FIG. 15 is a diagram illustrating a state where the operation history information of an annotator for a different-apparatus medical image when annotation information is generated is received by the information reception unit;

FIG. 17 is a flowchart illustrating a third_2 embodiment in which it is determined that an annotator has referred to related medical information in a case where the annotator has performed some operation on the related medical information;

FIG. 20 is a block diagram illustrating a processing unit of a processor of an information processing server of a fifth embodiment;

DETAILED DESCRIPTION

First Embodiment

Figure 1:
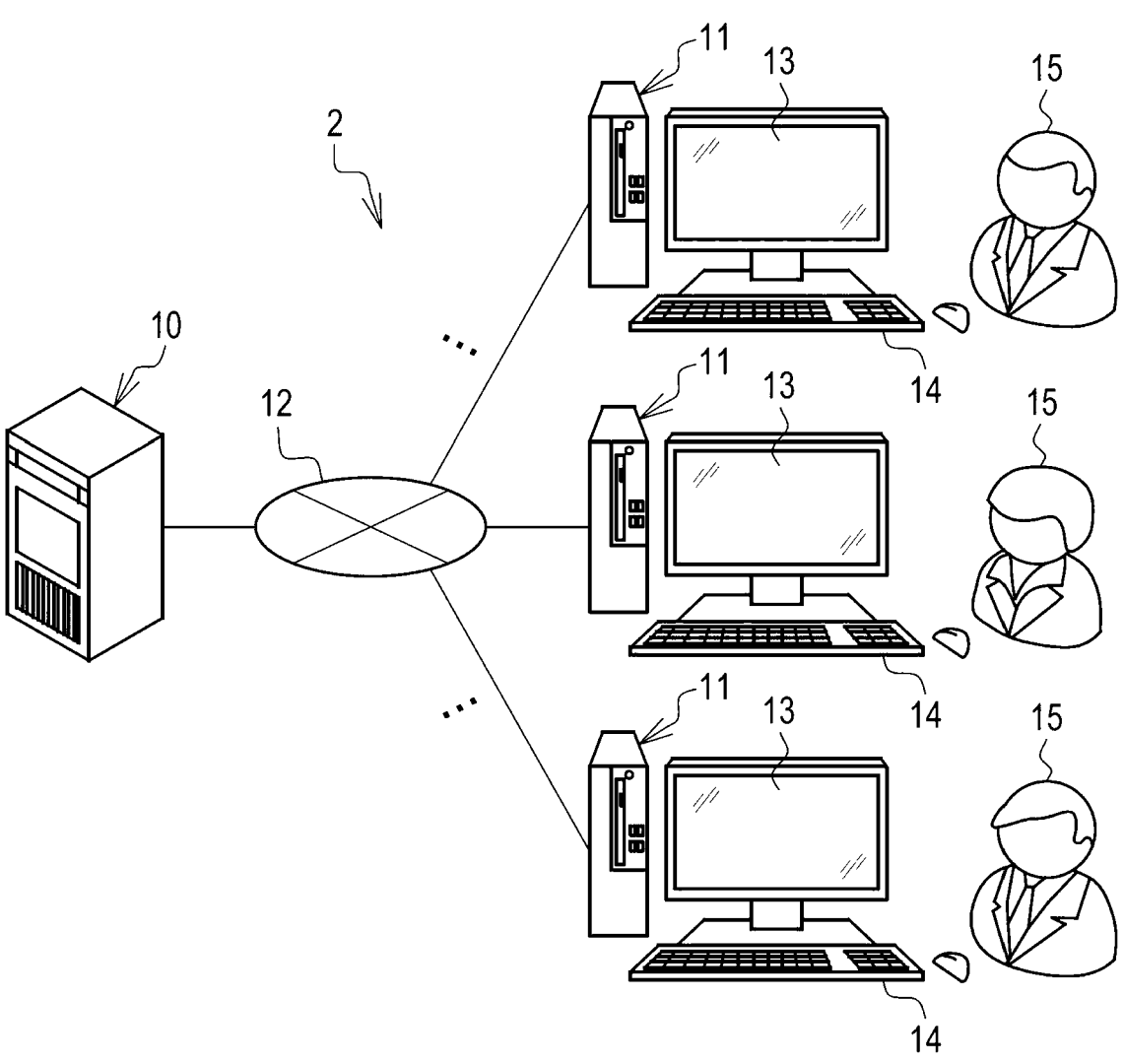
FIG. 1 is a diagram illustrating an information processing system.

As illustrated in FIG. 1 as an example, an information processing system 2 includes an information processing server 10 and a plurality of annotator terminals 11. The information processing server 10 and the annotator terminals 11 are connected to be able to communicate with each other via a network 12. The network 12 is, for example, the Internet or a wide area network (WAN).

The information processing server 10 is, for example, a server computer, a workstation, or the like, and is an example of an "information processing apparatus" according to the technique of the present disclosure. Each of the annotator terminals 11 includes a display 13 and an input device 14. The annotator terminal 11 is operated by an annotator 15. The annotator terminal 11 is, for example, a personal computer or a tablet terminal. The annotator 15 is, for example, a doctor, and is requested by the information processing server 10 to generate annotation information 23 (see FIG. 2). Note that the input device 14 is, for example, at least one of a keyboard, a mouse, a touch panel, a microphone, a gesture recognition apparatus, or the like.

Figure 2:
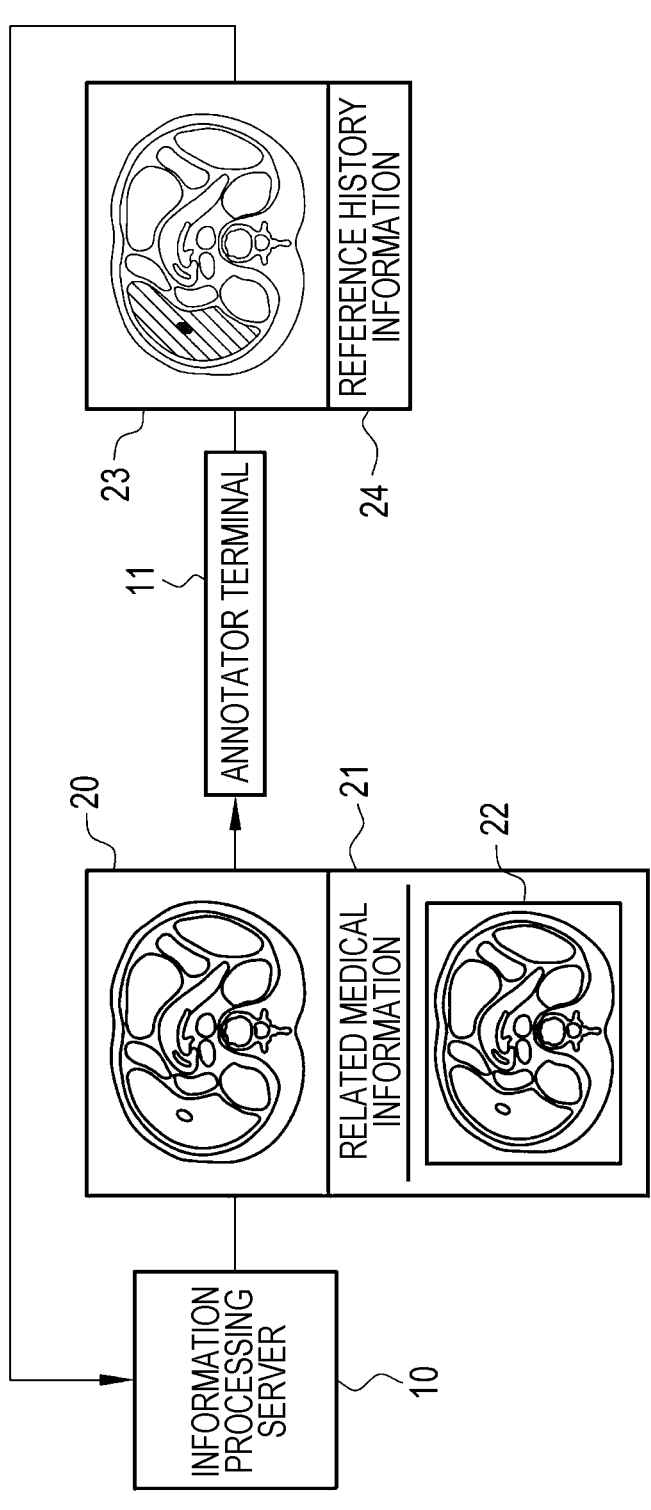
FIG. 2 is a diagram illustrating information transmitted and received between an information processing server and an annotator terminal.

As an example, as illustrated in FIG. 2, the information processing server 10 transmits a generation source medical image 20 to the annotator terminal 11. Here, an abdominal tomographic image of an axial cross section captured by a CT apparatus is exemplified as the generation source medical image 20. The generation source medical image 20 is an image for assigning a label according to a class which is an object of a recognition target based on a task set in advance.

Furthermore, the information processing server 10 transmits a related medical information 21 to the annotator terminal 11 together with the generation source medical image 20. The related medical information 21 is medical information related to the generation source medical image 20, and includes a different-apparatus medical image 22. The different-apparatus medical image 22 is, for example, an image captured on the same date as the generation source medical image 20 by a medical image capturing apparatus (also referred to as a modality) different from the generation source medical image 20. Here, an abdominal tomographic image of an axial cross section captured by a magnetic resonance imaging (MM) apparatus is illustrated as the different-apparatus medical image 22.

The annotator terminal 11 displays the generation source medical image 20 on the display 13. The annotator terminal 11 receives, from the annotator 15 via the input device 14, an input for assigning a label to each pixel of the generation source medical image 20. In this way, the annotation information 23 is generated by the annotator 15 in the annotator terminal 11.

Since the generation source medical image 20 of this example is an abdominal tomographic image, the annotation information 23 is generated for each tomographic plane of the abdominal tomographic image. Note that in FIG. 2, for ease of understanding, the human body structure is drawn in the annotation information 23, but the actual annotation information 23 does not include data of the human body structure, but only includes data of the assigned label (The same applies to FIG. 3 and the like.). More specifically, the annotation information 23 is information in which a set of a type of the label and position coordinates of the pixel of the generation source medical image 20 to which the label is assigned is registered.

Furthermore, the annotator terminal 11 displays the different-apparatus medical image 22 of the related medical information 21 on the display 13 in response to an instruction from the annotator 15. The annotator terminal 11 generates reference history information 24 indicating whether or not the annotator 15 has referred to the related medical information 21.

The annotator terminal 11 transmits the annotation information 23 and the reference history information 24 to the information processing server 10. The information processing server 10 receives the annotation information 23 and the reference history information 24 from the annotator terminal 11.

Figure 3:
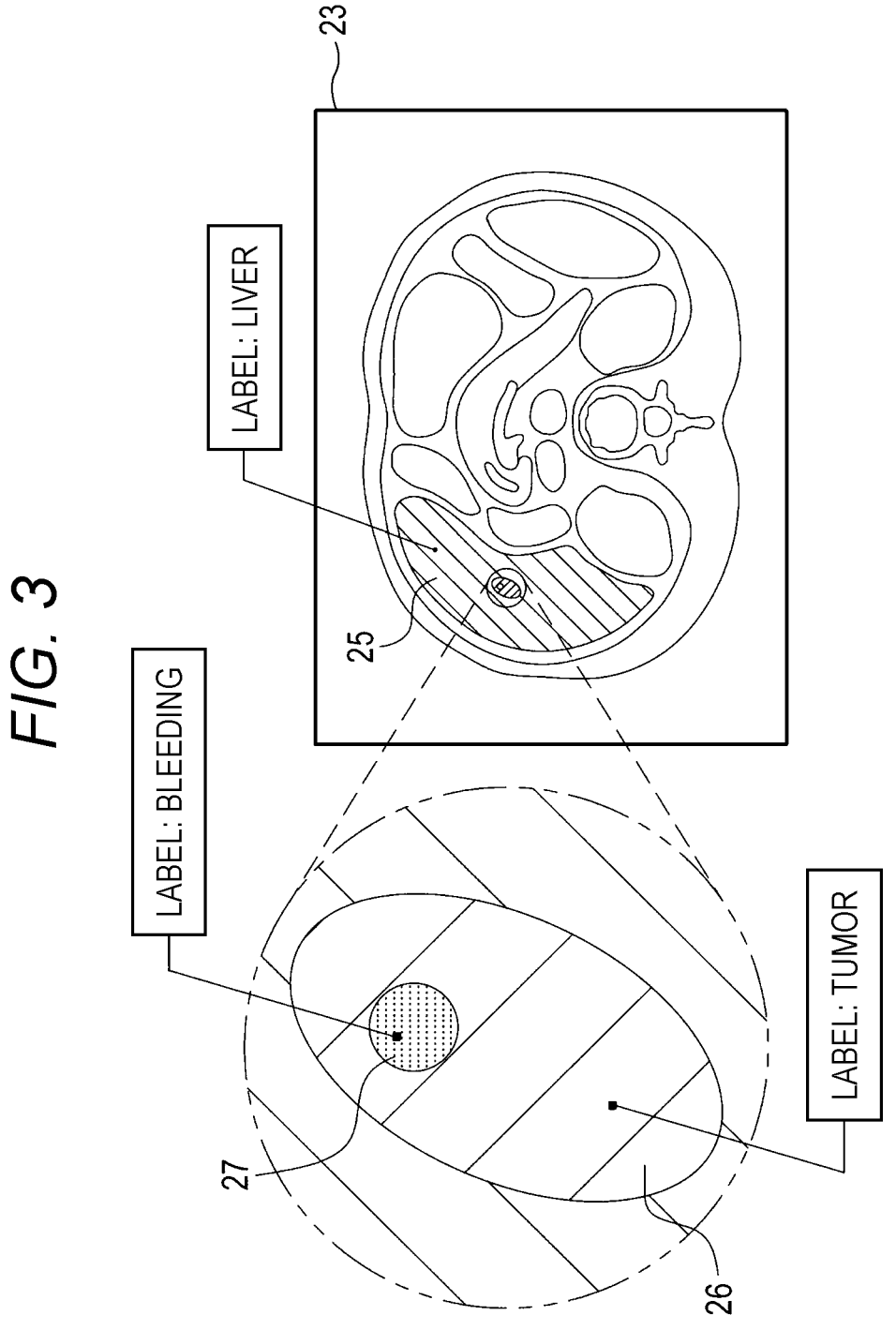
FIG. 3 is a diagram illustrating annotation information.

The classes set in the task of this example are a liver, a tumor in the liver, and a bleeding site in the tumor. Therefore, as an example, as illustrated in FIG. 3, the annotation information 23 includes a first region 25 to which a label of a liver is assigned, a second region 26 to which a label of a tumor is assigned, and a third region 27 to which a label of bleeding is assigned. Note that the second region 26 is naturally not designated in a case where the annotator 15 determines that no tumor is present. Similarly, the third region 27 is not designated in a case where the annotator 15 determines that there is no bleeding site.

Figure 4:
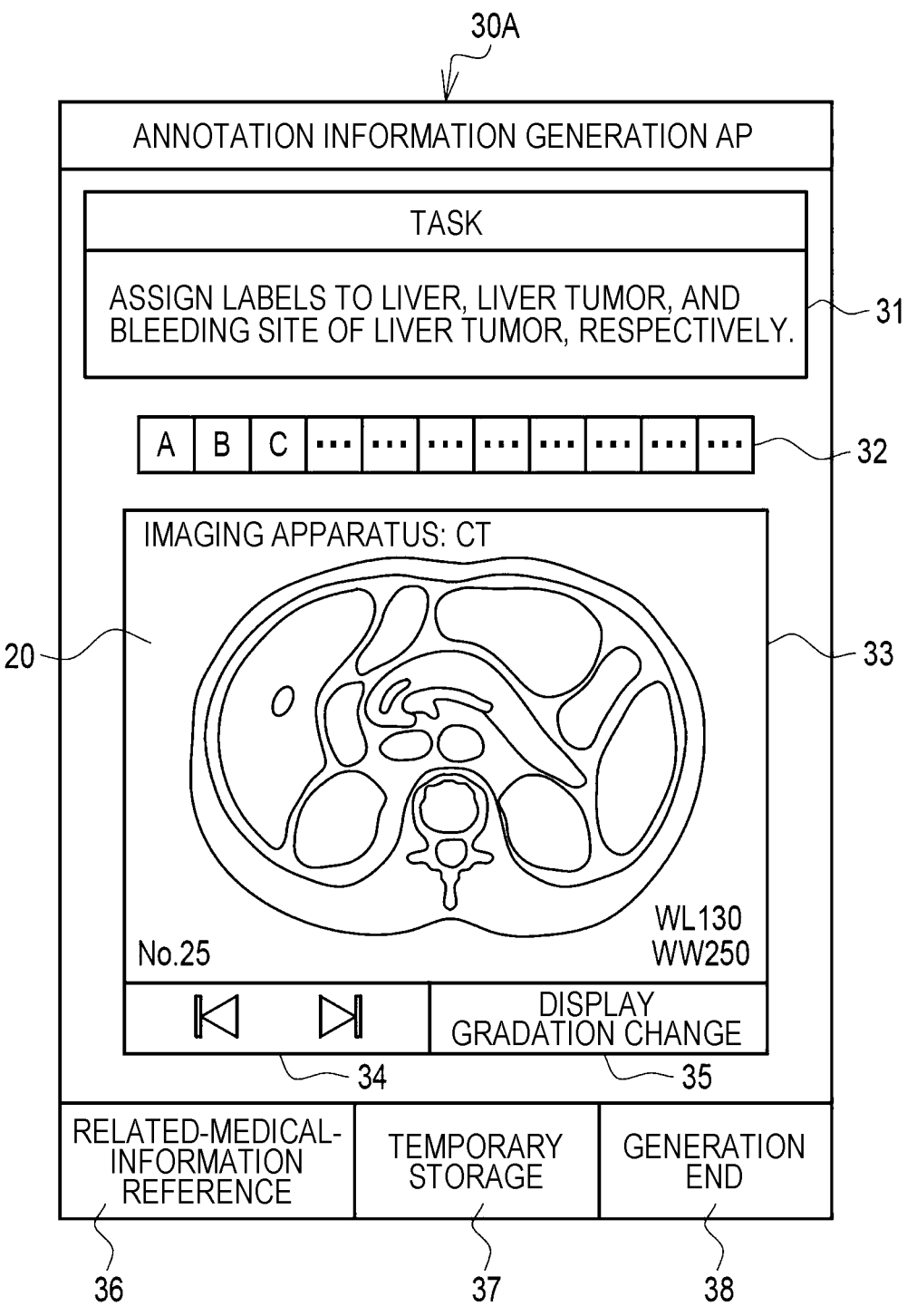
FIG. 4 is a diagram illustrating an annotation information generation screen.

For example, an annotation information generation screen 30A illustrated in FIG. 4 is displayed on the display 13 of the annotator terminal 11. The annotation information generation screen 30A includes a task display region 31, a tool button group 32, a generation source medical image display region 33, and the like. The content of the set task is displayed in the task display region 31. The tool button group 32 includes tool buttons of various tools for the annotator 15 to designate a label according to a class designated by a task. The various tools are, for example, a designated class switching tool, a line drawing tool, a region painting tool, and a region erasing tool.

The generation source medical image 20 is displayed in the generation source medical image display region 33. The annotation information 23 is generated by assigning a label using various tools on the generation source medical image 20 displayed in the generation source medical image display region 33.

A feedback button 34 and a display gradation change button 35 are provided in a lower portion of the generation source medical image display region 33. A slice position of the generation source medical image 20 can be changed by the operation of the feedback button 34. The slice position indicates a position of a tomographic plane when the generation source medical image 20 is a tomographic image as in the present example. Furthermore, a window level (WL) and a window width (WW) can be changed by operating the display gradation change button 35. The window level and the window width are parameters related to the display gradation of the generation source medical image 20. The window level is a center value of a display region of the generation source medical image 20 set with respect to a pixel value of the original image of the generation source medical image 20. The window width is a numerical value indicating a width of the display region of the generation source medical image 20.

As described above, the annotator 15 can freely change the slice position of the generation source medical image 20. Therefore, the annotator 15 can review at the generation source medical image 20 at a specific slice position many times. Furthermore, the annotator 15 can freely change the display gradation of the generation source medical image 20. Note that the generation source medical image 20 in the generation source medical image display region 33 can be moved in parallel, enlarged, and reduced (see FIG. 13).

In a lower part of the annotation information generation screen 30A, a related-medical-information reference button 36, a temporary storage button 37, and a generation end button 38 are further provided. In a case where the temporary storage button 37 is operated, the annotation information 23 generated so far is temporarily stored in a storage of the annotator terminal 11. In a case where the generation end button 38 is operated, the generated annotation information 23 is transmitted to the information processing server 10.

Figure 5:
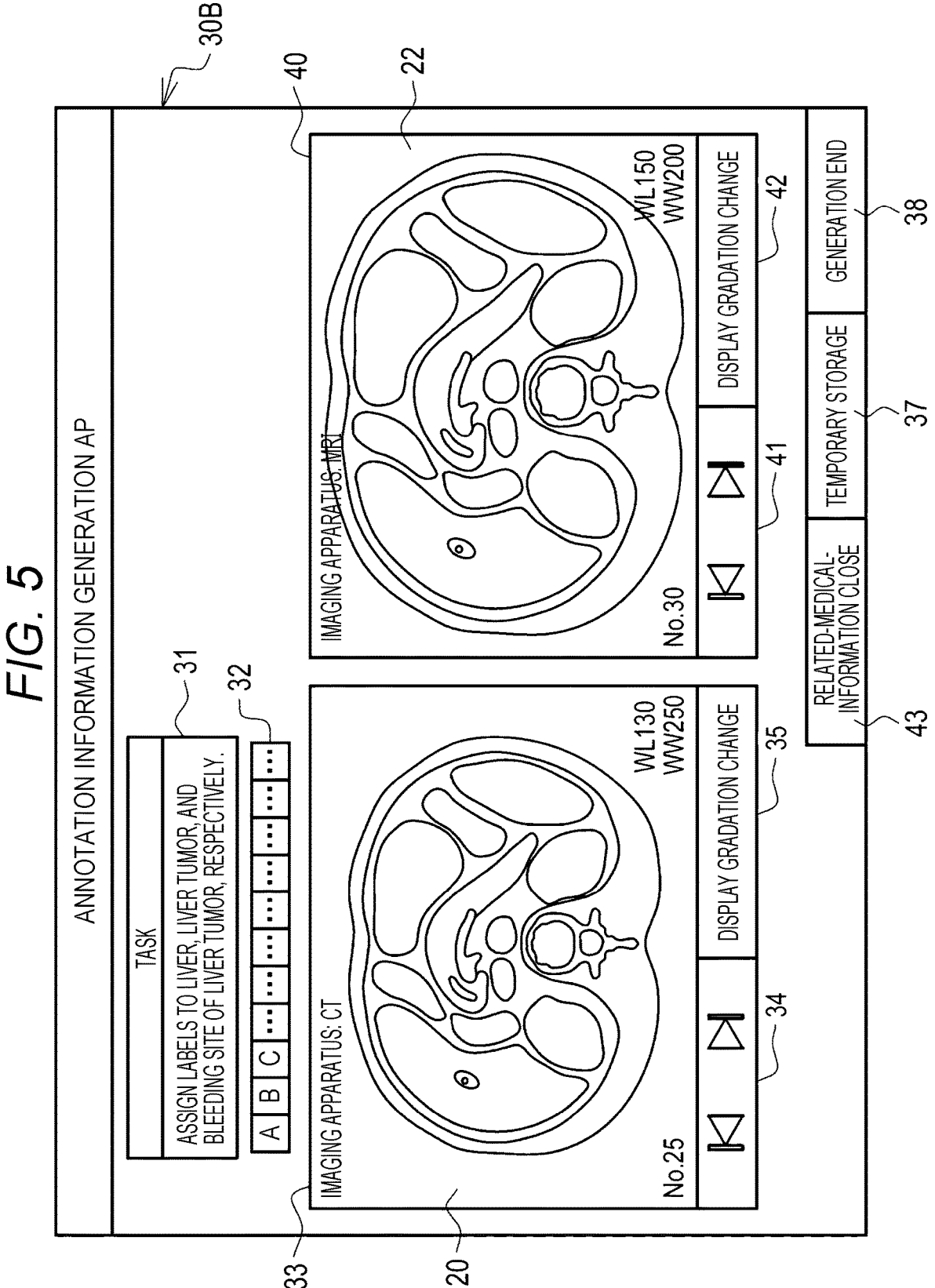
FIG. 5 is a diagram illustrating an annotation information generation screen on which related medical information is displayed.

In a case where the related-medical-information reference button 36 is operated, the screen changes to an annotation information generation screen 30B illustrated in FIG. 5 as an example. The annotation information generation screen 30B has a related-medical-information display region 40 on a right side of the generation source medical image display region 33. In the related-medical-information display region 40, the different-apparatus medical image 22 is displayed in the present example. A feedback button 41 and a display gradation change button 42, which have the same functions as the feedback button 34 and the display gradation change button 35 in the lower portion of the generation source medical image display region 33, are provided in the lower portion of the related-medical-information display region 40. Therefore, the annotator 15 can freely change the slice position and the display gradation of the different-apparatus medical image 22. Furthermore, the different-apparatus medical image 22 of the related-medical-information display region 40 can be moved in parallel, and can be enlarged and reduced.

In a lower portion of the annotation information generation screen 30B, a related-medical-information close button 43 is provided instead of the related-medical-information reference button 36. In a case where the related-medical-information close button 43 is operated, the related-medical-information display region 40 or the like is removed, and the display returns to the annotation information generation screen 30A.

Figure 6:
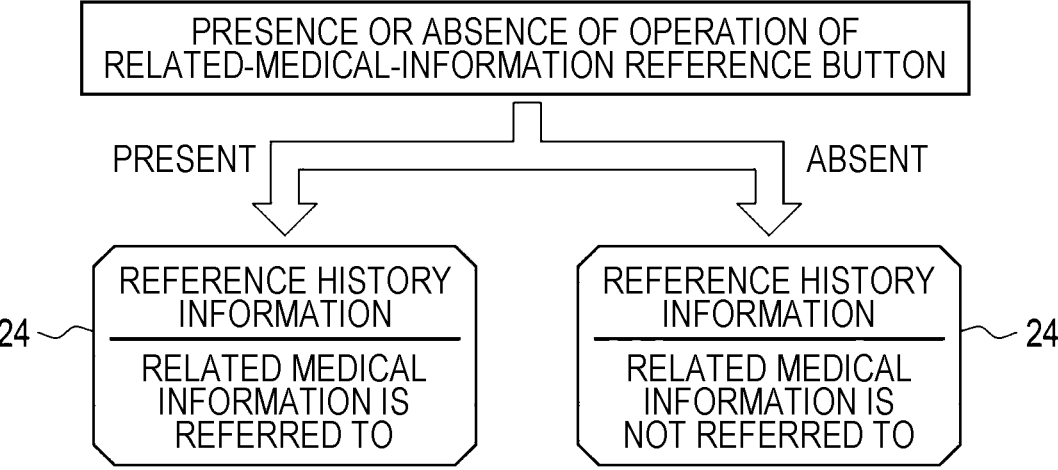
FIG. 6 is a diagram illustrating reference history information according to whether or not a related-medical-information reference button is operated.

As an example, as illustrated in FIG. 6, in a case where the annotator terminal 11 displays the annotation information generation screen 30B including the different-apparatus medical image 22, which is the related medical information 21, on the display 13 in response to the operation of the related-medical-information reference button 36 until the generation end button 38 is operated, that is, in a case where the presence or absence of the operation of the related-medical-information reference button 36 is present, the annotator terminal 11 transmits the reference history information 24 indicating that the related medical information 21 is referred to the information processing server 10. On the other hand, in a case where the related-medical-information reference button 36 is never operated until the generation end button 38 is operated and the annotation information generation screen 30B including the different-apparatus medical image 22 is not displayed on the display 13, that is, in a case where the presence or absence of the operation of the related-medical-information reference button 36 is absent, the annotator terminal 11 transmits the reference history information 24 indicating that the related medical information 21 is not referred to the information processing server 10.

Figure 7:
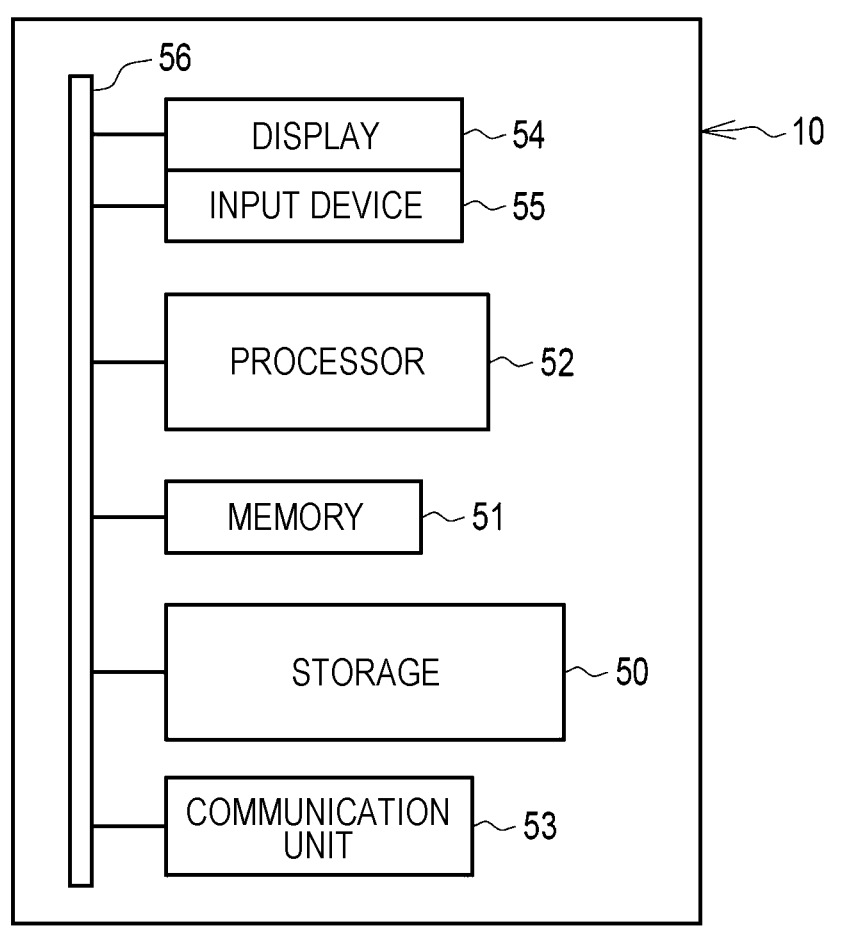
FIG. 7 is a block diagram illustrating a computer constituting the information processing server.

As an example, as illustrated in FIG. 7, the computer constituting the information processing server 10 includes a storage 50, a memory 51, a processor 52, a communication unit 53, a display 54, and an input device 55. These units are connected to each other through a bus line 56.

The storage 50 is a hard-disk drive that is provided in the computer constituting the information processing server 10 or is connected to the computer through a cable or a network. Alternatively, the storage 50 is a disk array in which a plurality of the hard-disk drives are connected. The storage 50 stores a control program such as an operating system, various application programs (hereinafter, abbreviated as an application program (AP)), various data associated with these programs, and the like. Note that a solid-state drive may be used instead of the hard-disk drive.

The memory 51 is a work memory for the processor 52 to execute processing. The memory 51 is, for example, a random-access memory (RAM) such as a dynamic random-access memory (DRAM) or a static random-access memory (SRAM). The processor 52 loads the program stored in the storage 50 to the memory 51 and executes processing according to the program. Thus, the processor 52 integrally controls each unit of the computer. The processor 52 is, for example, a central processing unit (CPU). Furthermore, the memory 51 is an example of a "memory" according to the technique of the present disclosure. Note that the storage 50 or both the storage 50 and the memory 51 may be defined as an example of a "memory" according to the embodiment of the technique of the present disclosure.

The communication unit 53 is a network interface that controls transmission of various kinds of information through the network 12 or the like. The display 54 displays various screens. The various screens are provided with an operation function through a graphical user interface (GUI). The computer constituting the information processing server 10 receives an input of an operation instruction from the input device 55 through various screens. The input device 55 is at least one of a keyboard, a mouse, a touch panel, a microphone, a gesture recognition apparatus, or the like.

Figure 8:
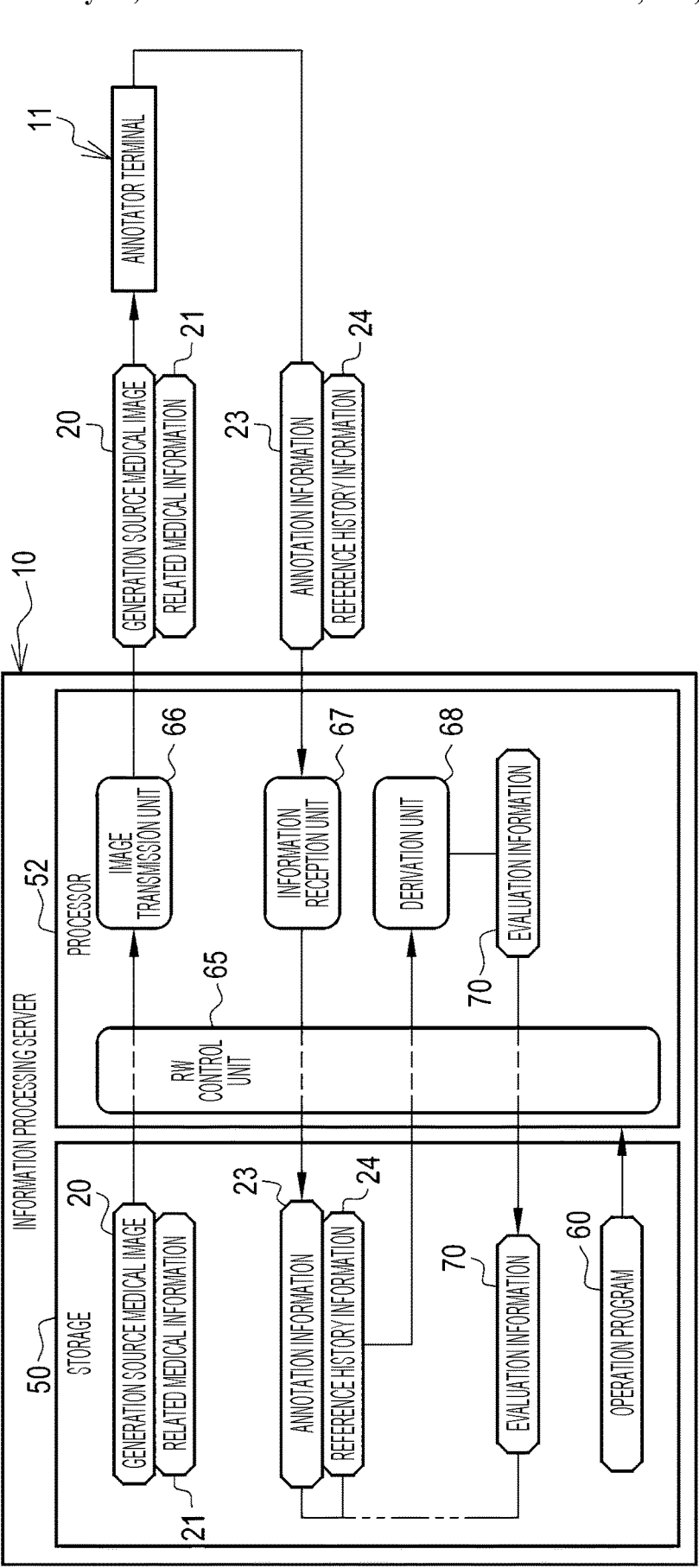
FIG. 8 is a block diagram illustrating a processing unit of a processor of the information processing server.

For example, as illustrated in FIG. 8, an operation program 60 is stored in the storage 50. The operation program 60 is an AP for causing a computer constituting the information processing server 10 to function as an "information processing apparatus" according to the technique of the present disclosure. That is, the operation program 60 is an example of a "program for operating an information processing apparatus" according to the technique of the present disclosure. In addition to the operation program 60, the generation source medical image 20, the related medical information 21, the annotation information 23, and the reference history information 24 are also stored in the storage 50. Note that, although only one generation source medical image 20, only one piece of related medical information 21, only one piece of annotation information 23, and only one piece of reference history information 24 are illustrated, a plurality of the generation source medical images 20, a plurality of pieces of related medical information 21, a plurality of pieces of annotation information 23, and a plurality of pieces of reference history information 24 are actually stored in the storage 50.

In a case where the operation program 60 is activated, the processor 52 cooperates with the memory 51 and the like to function as a read/write (hereinafter, abbreviated as RW) control unit 65, an image transmission unit 66, an information reception unit 67, and a derivation unit 68.

The RW control unit 65 controls storage of various kinds of information in the storage 50 and reading of various kinds of information in the storage 50. For example, the RW control unit 65 reads out the generation source medical image 20 and the related medical information 21 from the storage 50, and outputs the read generation source medical image 20 and related medical information 21 to the image transmission unit 66.

Information of the annotator terminal 11 that transmits the generation source medical image 20 and the related medical information 21 is registered in the storage 50 in advance. The image transmission unit 66 transmits the generation source medical image 20 and the related medical information 21 from the RW control unit 65 to the annotator terminal 11 registered in advance.

The information reception unit 67 receives the annotation information 23 and the reference history information 24 from the annotator terminal 11. As a result, the information processing server 10 acquires the annotation information 23 and the reference history information 24. The information reception unit 67 outputs the received annotation information 23 and reference history information 24 to the RW control unit 65. The RW control unit 65 stores the annotation information 23 and the reference history information 24 in the storage 50. Furthermore, the RW control unit 65 reads the reference history information 24 from the storage 50 and outputs the read reference history information 24 to the derivation unit 68.

The derivation unit 68 derives evaluation information 70 representing the quality of the annotation information 23 on the basis of the reference history information 24. The derivation unit 68 outputs the derived evaluation information 70 to the RW control unit 65. The RW control unit 65 stores the evaluation information 70 from the derivation unit 68 in the storage 50. In this case, the RW control unit 65 stores the evaluation information 70 in association with the annotation information 23 and the reference history information 24 as indicated by a two dot chain line.

The annotation information 23 is used as correct answer data together with the generation source medical image 20, which is the original image, in a learning phase or an accuracy evaluation phase of a machine learning model. In the present example, the annotation information 23 used as the correct answer data is selected based on the evaluation information 70. That is, the derivation of the evaluation information 70 is a part of the creation of the machine learning model.

In the learning phase, the generation source medical image 20 is input to the machine learning model. Then, the output annotation information output from the machine learning model is compared with the annotation information 23 to calculate the loss of the machine learning model. The machine learning model is updated according to the loss. The loss decreases as a difference between the output annotation information and the annotation information 23 decreases. For this reason, the degree of update also decreases as the difference between the output annotation information and the annotation information 23 decreases. The input of the generation source medical image 20, the output of the output annotation information, the calculation of the loss, and the update are repeated while a pair of the generation source medical image 20 and the annotation information 23, that is, the correct answer data is exchanged. Accordingly, the machine learning model is trained.

In the accuracy evaluation phase, the generation source medical image 20 is input to the machine learning model that has undergone a certain degree of training. Then, the output annotation information output from the machine learning model is compared with the annotation information 23 to calculate a loss, and the accuracy of the machine learning model is evaluated based on the loss. In the accuracy evaluation phase, only the accuracy is evaluated, and the update is not performed. The machine learning model determined to have an accuracy equal to or higher than the preset accuracy in the accuracy evaluation phase is used in a practical phase. Note that the correct answer data used in the learning phase is also referred to as training data, and the correct answer data used in the accuracy evaluation phase is also referred to as evaluation data.

Figure 9:
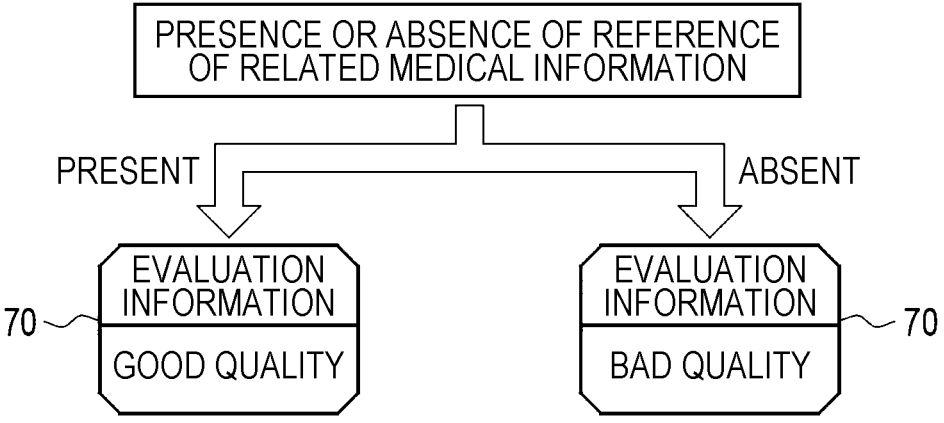
FIG. 9 is a diagram illustrating evaluation information according to contents of reference history information.

As an example, as illustrated in FIG. 9, in a case where the reference history information 24 has the contents indicating that the related medical information 21 has been referred to, that is, in a case where the presence or absence of the reference of the related medical information 21 is present, the derivation unit 68 derives the evaluation information 70 indicating that the quality of the annotation information 23 is good. On the other hand, in a case where the reference history information 24 has the contents indicating that the related medical information 21 has not been referred to, that is, in a case where the presence or absence of reference of the related medical information 21 is absent, the derivation unit 68 derives the evaluation information 70 indicating that the quality of the annotation information 23 is poor. As described above, the evaluation information 70 has a higher quality evaluation when the annotator 15 refers to the related medical information 21 than when the annotator 15 does not refer to the related medical information 21. Note that, for example, only the generation source medical image 20 and the annotation information 23 associated with the evaluation information 70 indicating that the quality is good are used as the correct answer data.

Figure 10:
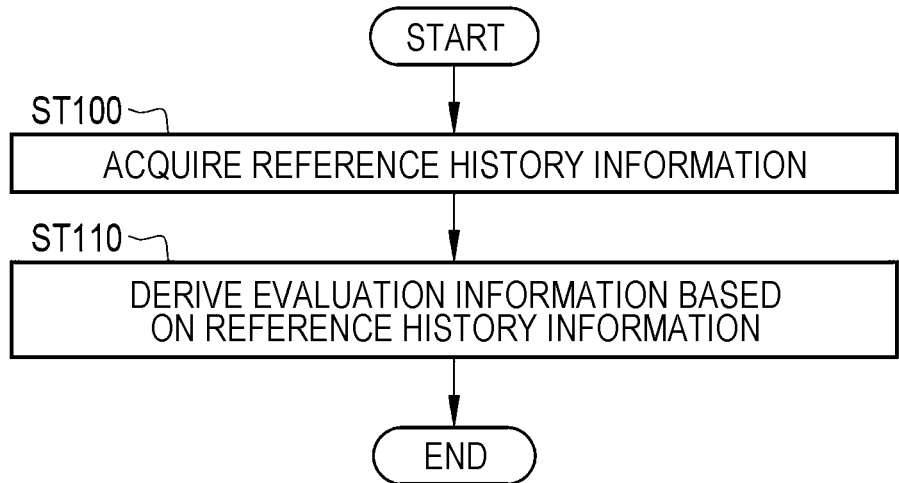
FIG. 10 is a flowchart illustrating a processing procedure of the information processing server.

Next, an action of the above-described configuration will be described referring to a flowchart of FIG. 10. In a case where the operation program 60 is activated, the processor 52 of the information processing server 10 functions as the RW control unit 65, the image transmission unit 66, the information reception unit 67, and the derivation unit 68 as illustrated in FIG. 8.

First, the RW control unit 65 reads out the generation source medical image 20 and the related medical information 21 from the storage 50. The read generation source medical image 20 and related medical information 21 are output from the RW control unit 65 to the image transmission unit 66. The generation source medical image 20 and the related medical information 21 are transmitted to the annotator terminal 11 by the image transmission unit 66.

In the annotator terminal 11, the annotation information generation screen 30A illustrated in FIG. 4 is displayed on the display 13. Then, the annotator 15 generates the annotation information 23 based on the generation source medical image 20. At this time, in a case where the related-medical-information reference button 36 is operated by the annotator 15, the screen changes to the annotation information generation screen 30B illustrated in FIG. 5, and the different-apparatus medical image 22 as the related medical information 21 is displayed.

As illustrated in FIG. 6, the reference history information 24 indicating whether or not the annotator 15 has referred to the related medical information 21 is generated in the annotator terminal 11. The annotation information 23 and the reference history information 24 are transmitted from the annotator terminal 11 to the information processing server 10.

In the information processing server 10, the information reception unit 67 receives the annotation information 23 and the reference history information 24 from the annotator terminal 11. Accordingly, the reference history information 24 is acquired (step ST100). The annotation information 23 and the reference history information 24 are output from the information reception unit 67 to the RW control unit 65, and are stored in the storage 50 by the RW control unit 65.

The RW control unit 65 reads the reference history information 24 from the storage 50. The read reference history information 24 is output from the RW control unit 65 to the derivation unit 68.

As illustrated in FIG. 9, the derivation unit 68 derives the evaluation information 70 indicating the quality of the annotation information 23 based on the reference history information 24 (step ST110). The evaluation information 70 is output from the derivation unit 68 to the RW control unit 65 and is stored in the storage 50 by the RW control unit 65.

As described above, the processor 52 of the information processing server 10 includes the information reception unit 67 and the derivation unit 68. The information reception unit 67 receives and acquires the reference history information 24 from the annotator terminal 11. The reference history information 24 is information representing a reference history by the annotator of the related medical information 21 related to the generation source medical image 20 which is the source of the generation of the annotation information 23 when the annotator 15 generates the annotation information 23 as the correct answer data of the machine learning model for analyzing the medical image. The derivation unit 68 derives evaluation information representing the quality of the annotation information 23 on the basis of the reference history information 24.

The quality of the annotation information 23 greatly depends on whether or not the related medical information 21 is referred to when the annotation information 23 is generated. Therefore, according to the technique of the present disclosure in which the reference history information 24 of the related medical information 21 is acquired and the evaluation information 70 is derived based on the reference history information 24, it is possible to more accurately evaluate the quality of the annotation information 23 compared to a case in which the evaluation information 70 is derived without using the reference history information 24.

As illustrated in FIG. 9, in the evaluation information 70, the evaluation of the quality of the annotation information 23 is higher when the annotator 15 refers to the related medical information 21 than when the annotator 15 does not refer to the related medical information 21. Therefore, the quality of the annotation information 23 can be properly evaluated.

As illustrated in FIG. 2, the related medical information 21 includes the different-apparatus medical image 22 captured by a medical image capturing apparatus different from the generation source medical image 20. For this reason, it is possible to assist assignment of a label to a class which is not clear only in the generation source medical image 20, for example, a lesion such as a tumor which is not depicted in the generation source medical image 20 can be detected in the different-apparatus medical image 22. As a result, the quality of the annotation information 23 can be improved.

Second Embodiment

As illustrated in FIG. 11 as an example, in the present embodiment, five types of related medical information 80A, 80B, 80C, 80D, and 80E are handled. The related medical information 80A includes the different-apparatus medical image 22 similar to the related medical information 21 of the first embodiment. The related medical information 80B includes a different-date-and-time medical image 81. The different-date-and-time medical image 81 is an image captured by the same medical image capturing apparatus as that of the generation source medical image 20 at an imaging date and time different from that of the generation source medical image 20, typically, at an imaging date and time before that of the generation source medical image 20. The related medical information 80C includes sample inspection data 82. The sample inspection data 82 is data representing a result of a sample inspection performed on the patient of the generation source medical image 20. The sample inspection includes a blood inspection, a urine inspection, a stool inspection, and the like.

The related medical information 80D includes a pathological diagnosis result 83. The pathological diagnosis result 83 is a result of a diagnosis performed by a pathologist via microscope observation of a lesion, such as a tumor, collected from a patient of the generation source medical image 20. The related medical information 80E includes a computer-aided diagnosis (CAD) processing result 84. The CAD processing result 84 is a result obtained by applying a ready-made CAD processing program to the generation source medical image 20. The CAD processing result 84 is, for example, a frame surrounding a portion where a tumor of the liver is considered to be present. The different-date-and-time medical image 81, the sample inspection data 82, the pathological diagnosis result 83, and the CAD processing result 84 are displayed so as to be switchable in the related-medical-information display region 40 on the of the annotation information generation screen illustrated in FIG. 5. By referring to the different-date-and-time medical image 81, the sample inspection data 82, the pathological diagnosis result 83, and the CAD processing result 84 in the related-medical-information display region 40, the annotator 15 can assign a label to an appropriate region with higher likelihood. As a result, the quality of the annotation information 23 can be improved.

As an example, as illustrated in FIG. 12, in reference history information 90 of the present embodiment, whether or not the annotator 15 has referred to is registered for each of the related medical information 80A to 80E. Then, the derivation unit 68 (not illustrated) of the present embodiment derives evaluation information 92 using an evaluation level table 91. An evaluation level of the annotation information 23 corresponding to the number of pieces of related medical information referred to by the annotator 15 is registered in the evaluation level table 91. Specifically, in a case where the number of pieces of related medical information referred to by the annotator 15 is 0, the evaluation level 1 is registered, and in a case where the number of pieces of related medical information referred to by the annotator 15 is 1, the evaluation level 2 is registered. Furthermore, in a case where the number of pieces of related medical information referred to by the annotator 15 is 2 and 3, the evaluation level 3 is registered. In a case where the number of pieces of related medical information referred to by the annotator 15 is 4 and 5, the evaluation level 4 is registered. The evaluation level of 4 is the highest, and the evaluation level of 1 is the lowest. Note that the evaluation level may be represented by A to D, or the like.

FIG. 12 illustrates a case where the annotator 15 refers to two of the different-apparatus medical image 22 (related medical information 80A) and the pathological diagnosis result 83 (related medical information 80D) among the five types of related medical information 80A to 80E. In this case, since the number of pieces of related medical information referred to by the annotator 15 is 2, the derivation unit 68 derives the evaluation level 3 as the evaluation information 92.

As described above, in the second embodiment, the derivation unit 68 derives the evaluation information 92 according to the number of pieces of related medical information referred to by the annotator 15 among the plurality of types of related medical information 80A to 80E. Since a complex determination is added instead of a simple determination as to whether or not the related medical information 21 of the first embodiment is referred to, it is possible to derive the evaluation information 92 with higher reliability.

Note that, in the present embodiment, the evaluation level is derived according to the number of pieces of referenced related medical information regardless of the types of the five types of related medical information 80A to 80E, but the present disclosure is not limited thereto. The evaluation may be weighted according to the types of the related medical information 80A to 80E. For example, in a case where the related medical information based on the diagnosis result of a method different from the diagnosis related to the medical image such as the sample inspection data 82 and the pathological diagnosis result 83 is referred to, the evaluation may be higher than that in a case where at least one of the image information such as the different-apparatus medical image 22 and the different-date-and-time medical image 81 or the CAD processing result 84 indicating the image processing result is referred to. Specifically, in a case where the related medical information such as the sample inspection data 82 and the pathological diagnosis result 83 is referred to, the number of pieces of related medical information referred to by the annotator 15 is counted as +2 for one item, and in a case where the image information such as the different-apparatus medical image 22 and the different-date-and-time medical image 81 is referred to, the number of pieces of related medical information referred to by the annotator 15 is counted as +1 for one item.

Third_1 Embodiment

Figure 13:
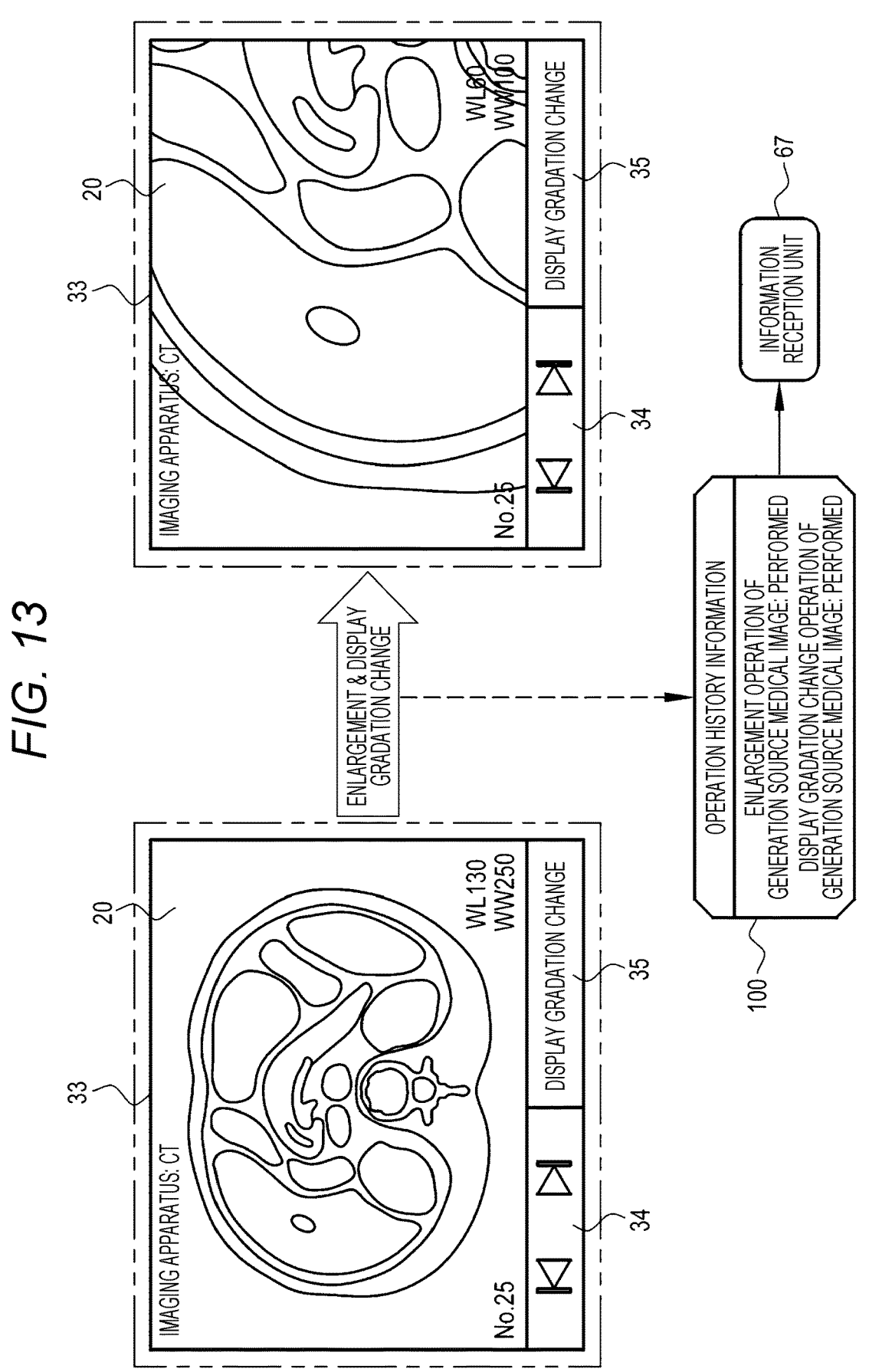
FIG. 13 is a diagram illustrating a state where an information reception unit receives operation history information of an annotator with respect to a generation source medical image when annotation information is generated.

As an example, as illustrated in FIG. 13, in the present embodiment, the annotator terminal 11 generates operation history information 100. The operation history information 100 is a history of various operations performed on the generation source medical image 20 displayed in the generation source medical image display region 33 of the annotation information generation screens 30A and 30B. The operation history information 100 indicates whether or not the enlargement operation has been performed on the generation source medical image 20 of the generation source medical image display region 33 and whether or not the display gradation change operation has been performed on the generation source medical image of the generation source medical image display region 33. FIG. 13 illustrates a case where the enlargement operation of enlarging a portion of the liver is performed. Furthermore, FIG. 13 illustrates a case where the display gradation change operation of changing the window level from 130 to 60 and the window width from 250 to 100 is also performed.

The annotator terminal 11 transmits the operation history information 100 to the information processing server 10 together with the annotation information 23 and the reference history information 24. The information reception unit 67 of the present embodiment receives and acquires the operation history information 100 together with the annotation information 23 and the reference history information 24.

For example, as illustrated in FIG. 14, the reference history information 90 of the second embodiment is used in the present embodiment. The derivation unit 68 (not illustrated) of the present embodiment derives evaluation information 102 using an evaluation level table 101 based on the reference history information 90 and the operation history information 100. In the evaluation level table 101, the number of pieces of related medical information referred to by the annotator 15 and the evaluation level of the annotation information 23 corresponding to the added value of the number of operations performed on the generation source medical image 20 are registered. Specifically, an evaluation level 1 is registered in a case where the added values are 0 and 1, and an evaluation level 2 is registered in a case where the added values are 2 and 3. Furthermore, an evaluation level 3 is registered in a case where the added values are 4 and 5, and an evaluation level 4 is registered in a case where the added values are 6 and 7. The evaluation level is highest at 4 and lowest at 1 as in the second embodiment.

FIG. 14 illustrates a case where the annotator 15 refers to two of the different-apparatus medical image 22 (related medical information 80A) and the pathological diagnosis result 83 (related medical information 80D) among the five types of related medical information 80A to as in the case of FIG. 12 of the second embodiment. Furthermore, FIG. 14 illustrates a case in which both the operation of enlarging the generation source medical image 20 and the display gradation change operation are performed. In this case, since the sum of the number of pieces of related medical information referred to by the annotator 15 and the number of operations performed on the generation source medical image 20 is 2+2=4, the derivation unit 68 derives the evaluation level 3 as the evaluation information 102.

As described above, in the third_1 embodiment, the information reception unit 67 acquires the operation history information 100 of the annotator 15 for the generation source medical image 20 when the annotation information 23 is generated by receiving the operation history information 100 from the annotator terminal 11. The derivation unit 68 derives the evaluation information 102 on the basis of the operation history information 100 in addition to the reference history information 90. Therefore, the quality of the annotation information 23 can be evaluated more accurately than in the first embodiment in which the evaluation information 70 is derived only from the reference history information 24.

The operation history information 100 is information related to the enlargement operation and the display gradation change operation. The enlargement operation is an operation necessary for observing a region to which the label is to be assigned in more detail. The display gradation change operation is an operation necessary for making a region to which a label is to be assigned easier to see. As described above, in a case where the operation history information 100 is used as the information related to the enlargement operation and the display gradation change operation that are indispensable to the assignment of an accurate label, it is possible to contribute to the accurate evaluation of the quality of the annotation information 23.

In FIG. 13, the operation history information 100 for the generation source medical image 20 is exemplified, but the present disclosure is not limited thereto. As an example, as illustrated in FIG. 15, operation history information 105 for the different-apparatus medical image 22 displayed in the related-medical-information display region 40 on the annotation information generation screen 30B may be generated instead of or in addition to the operation history information 100. Similar to the operation history information 100, the operation history information 105 indicates whether or not an enlargement operation has been performed on the different-apparatus medical image 22 in the related-medical-information display region 40 and whether or not a display gradation change operation has been performed on the different-apparatus medical image 22 in the related-medical-information display region 40. FIG. 15 illustrates a case where the enlargement operation of enlarging a portion of the liver is performed. Furthermore, FIG. 15 illustrates a case where the display gradation change operation of changing the window level from 150 to 100 and the window width from 200 to 150 is also performed.

The operation history information 100 and 105 may be information relating to at least one of the enlargement operation or the display gradation change operation. Furthermore, whether or not a parallel movement operation has been performed may be added to the operation history information 100 and 105.

Figure 16:
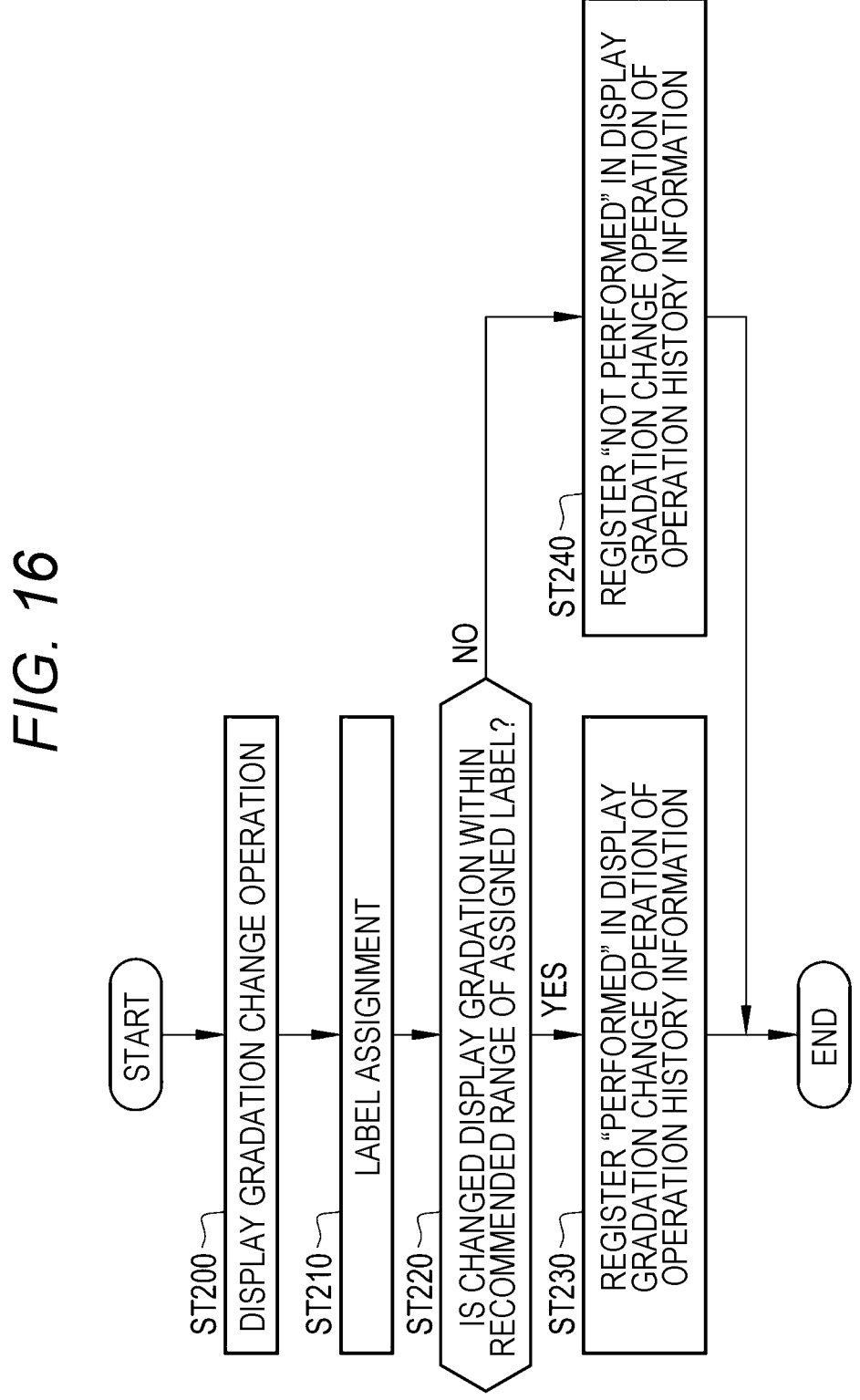
FIG. 16 is a flowchart illustrating a mode in which execution is registered in a display gradation change operation of operation history information only in a case where display gradation is changed to display gradation in a recommended range.

Note that, for example, an aspect illustrated in FIG. 16 may be implemented in the annotator terminal 11. That is, for example, in a case where the display gradation change operation of the generation source medical image 20 is performed by the annotator 15 (step ST200) and a label corresponding to a certain class is assigned (step ST210), it is determined whether or not the changed display gradation is within a recommended range of the assigned label (step ST220). In a case where it is determined that the changed display gradation is within the recommended range of the assigned label (YES in step ST220), "performed" is registered in the display gradation change operation of the operation history information 100 (step ST230). On the other hand, in a case where it is determined that the changed display gradation is not within the recommended range of the assigned label (NO in step ST220), "not performed" is registered in the display gradation change operation of the operation history information 100 (step ST240). The recommended range of the display gradation is set in advance for each class. The recommended range of the display gradation is set based on, for example, an average value of the display gradation set when the unspecified number of annotators 15 assign the label corresponding to the class.

According to the aspect illustrated in FIG. 16, "performed" is not registered in the display gradation change operation of the operation history information 100 unless the display gradation is changed to the display gradation of the recommended range. For this reason, it is possible to prevent the evaluation of the quality of the annotation information 23 from being high even in a case where the label is assigned with the inappropriate display gradation, since the display gradation change operation is considered to have been performed.

Note that it is determined whether or not the display gradation change operation has been performed depending on whether or not the display gradation has been changed to the display gradation of the recommended range which is the condition based on the generation source medical image 20 or the related medical information 21 to be displayed, but the present disclosure is not limited thereto. Even if the condition based on the generation source medical image 20 or the related medical information 21 is not satisfied, in a case where any display gradation change operation is performed, it may be determined that the display gradation change operation is performed unconditionally. Furthermore, even in the case of the enlargement operation, it may be determined that the enlargement operation has been performed in a case where the label is assigned to the region displayed by the enlargement operation, and it may be determined that the enlargement operation has been not performed in a case where the label is not assigned to the region displayed by the enlargement operation.

Note that the same generation source medical image 20 may be transmitted to the plurality of annotator terminals 11 to cause the plurality of annotators 15 to generate the annotation information 23, and the recommended range of the display gradation may be set on the basis of an average value or the like of the display gradation set at that time.

Furthermore, the recommended range of the display gradation may be set for each organ and/or each disease.

Third_2 Embodiment

As illustrated in FIG. 17 as an example, in the present embodiment, in a case where there is any operation on the related medical information 21 by the annotator 15, it is determined that the annotator 15 has referred to the related medical information 21.

In FIG. 17, in a case where the related medical information 21 is displayed in the related-medical-information display region 40 (step ST300) and some operation is performed on the related medical information 21 by the annotator 15 (YES in step ST310), it is determined that the annotator 15 has referred to the related medical information 21, and the fact that the related medical information 21 has been referred to is registered in the reference history information (step ST320). On the other hand, in a case where the annotator 15 does not perform any operation on the related medical information 21 (NO in step ST310), it is determined that the annotator 15 has not referred to the related medical information 21, and the fact that the related medical information 21 has not been referred to is registered in the reference history information (step ST330).

For example, in a case where the operation history information on the different-apparatus medical image 22 has the contents that the enlargement operation of the different-apparatus medical image 22 has been performed, it is determined that the annotator 15 has referred to the different-apparatus medical image 22, and the fact is registered in the reference history information. Alternatively, in a case where the operation history information for the different-date-and-time medical image 81 indicates that the display gradation change operation of the different-date-and-time medical image 81 is performed and the changed display gradation is within the recommended range of the assigned label, it may be determined that the annotator has referred to the different-date-and-time medical image 81, and the fact may be registered in the reference history information.

Depending on the annotator 15, the different-apparatus medical image 22 or the like may be simply displayed, the enlargement operation or the like may not be performed, and the different-apparatus medical image 22 or the like may not be referred to. Furthermore, in the first embodiment, the different-apparatus medical image 22 or the like is displayed only in a case where the related-medical-information reference button 36 is operated. However, depending on the specifications, the different-apparatus medical image 22 or the like may be automatically displayed without waiting for the operation of the annotator 15 such as the operation of the related-medical-information reference button 36. Therefore, in a case where it is determined that the annotator 15 has referred to the different-apparatus medical image 22 or the like simply by displaying the different-apparatus medical image 22 or the like, there is a concern that the accuracy of the quality evaluation of the annotation information 23 may be impaired. Therefore, in the third_2 embodiment, in a case any some operation is performed on the related medical information 21 by the annotator 15, it is determined that the annotator 15 has referred to the related medical information 21. Therefore, the accuracy of the quality evaluation of the annotation information 23 can be ensured.

Note that the operation history information is not limited to the enlargement operation and the display gradation change operation with respect to the related medical information 21. The display time of the related medical information 21 may be measured in the annotator terminal 11, and it may be determined that the related medical information 21 has been referred to if the display time is greater than or equal to a preset threshold value. The display time of the related medical information 21 may be transmitted from the annotator terminal 11 to the information processing server 10, and the information processing server 10 may determine whether or not the related medical information 21 has been referred to. Furthermore, the annotator terminal 11 has a function of detecting the line of sight of the annotator 15, detect the line of sight of the annotator 15 viewing the annotation information generation screen 30B, and transmit the time when the line of sight is placed on the related-medical-information display region 40 in which the related medical information 21 is displayed to the information processing server 10 as operation history information associated with the related medical information 21. The information processing server 10 may determine that the related medical information 21 has been referred to in a case where the time during which the line of sight is placed, which is recorded in the operation history information, is a predetermined period (for example, three minutes in total).

Fourth Embodiment

Figure 18:
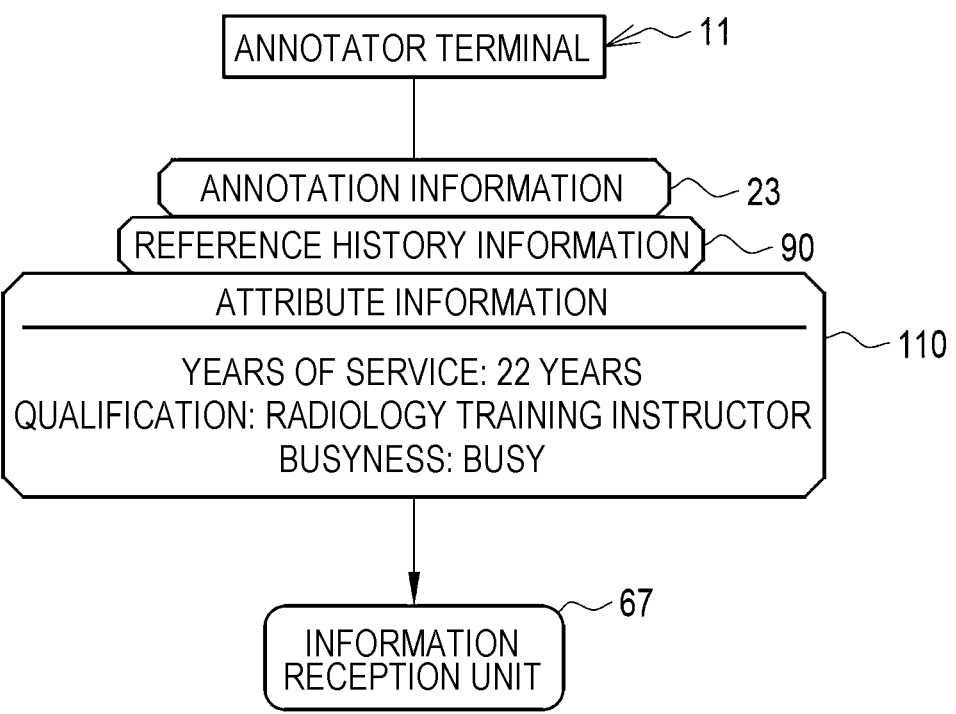
FIG. 18 is a diagram illustrating a state where the information reception unit receives attribute information of an annotator from an annotator terminal.

As an example, as illustrated in FIG. 18, the annotator terminal 11 transmits attribute information 110 of the annotator 15 to the information processing server 10 together with the annotation information 23 and the reference history information 90. The information reception unit 67 according to this embodiment receives and obtains the attribute information 110 together with the annotation information 23 and the reference history information 90. The attribute information 110 includes length of service, qualifications, and busyness of the annotator 15. The qualification includes a radiological diagnosis specialist or the like in addition to the illustrated radiological training instructor. The busyness is obtained by the annotator 15 inputting their own level of busyness to the annotator terminal 11. The busyness includes "normal" and "not busy" in addition to the illustrated "busy".

Figure 19:
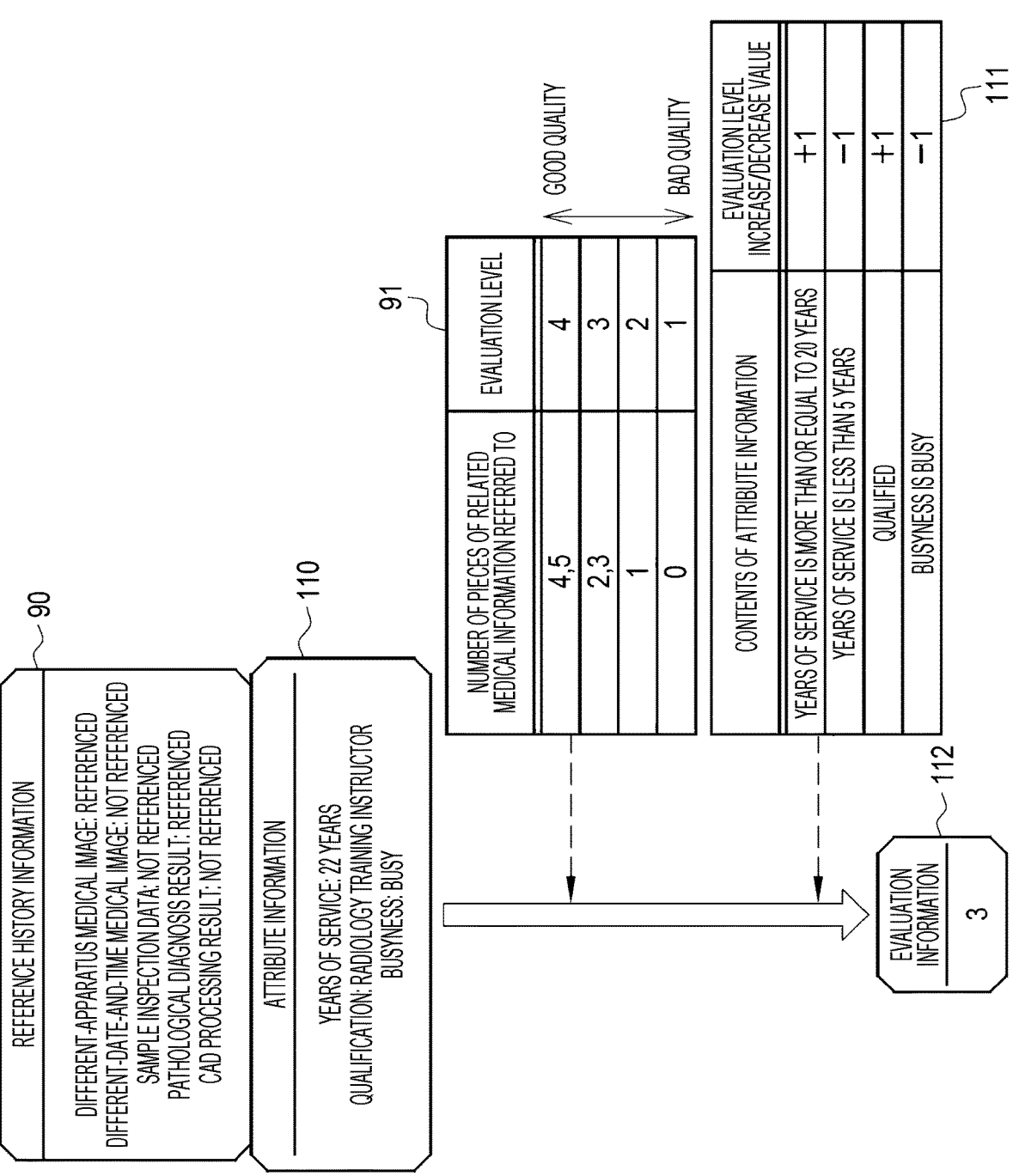
FIG. 19 is a diagram illustrating a fourth embodiment in which evaluation information is derived based on attribute information in addition to reference history information.

For example, as illustrated in FIG. 19, the derivation unit 68 (not illustrated) of the present embodiment derives evaluation information 112 using the evaluation level table 91 of the second embodiment and an evaluation level increase/decrease value table 111 based on the reference history information 90 and the attribute information 110. In the evaluation level increase/decrease value table 111, an increase/decrease value of the evaluation level is registered for each content of the attribute information 110. Specifically, the increase/decrease value of +1 is registered in a case where a length of service is more than or equal to 20 years, and the increase/decrease value of −1 is registered in a case where a length of service is less than 5 years. Furthermore, in a case of qualified (qualified person), the increase/decrease value +1 is registered, and in a case where the busyness is "busy", the increase/decrease value −1 is registered.

FIG. 19 illustrates a case where the annotator 15 refers to two of the different-apparatus medical image 22 (related medical information 80A) and the pathological diagnosis result 83 (related medical information 80D) among the five types of related medical information 80A to as in the case of FIG. 12 of the second embodiment. Furthermore, in FIG. 19, the case of the annotator 15 in which the length of service of 22 years, the qualification of the radiological training instructor, and the busyness of "busy" is illustrated. In this case, the number of pieces of related medical information referred to by the annotator 15 is 2, and the increase/ decrease values of the evaluation level according to the attribute information 110 are 22 years of length of service=+ 1, qualified=+1, and the busyness is "busy"=−1, that is, +1. Therefore, the derivation unit 68 derives the evaluation level 3 as the evaluation information 112.

As described above, in the fourth embodiment, the information reception unit 67 acquires the attribute information 110 of the annotator 15 by receiving it from the annotator terminal 11. The derivation unit 68 derives the evaluation information 112 on the basis of the attribute information 110 in addition to the reference history information 90. Therefore, the quality of the annotation information 23 can be evaluated more accurately than in the first embodiment in which the evaluation information 70 is derived only from the reference history information 24.

According to the aspect illustrated in FIG. 19, the evaluation of the quality of the annotation information 23 generated by the annotator 15 having a relatively long length of service or by the annotator 15 who is the qualified person is relatively high. On the other hand, the evaluation of the quality of the annotation information 23 generated by the annotator 15 with a relatively short length of service or by the annotator 15 who is busy is relatively low. The accuracy of label assignment is considered to be relatively high for the annotator 15 with a relatively long length of service or for the annotator 15 who is a qualified person. On the other hand, the accuracy of label assignment is considered to be relatively low for the annotator 15 with a relatively short length of service or for the busy annotator 15. Therefore, it is possible to perform the quality evaluation adapted to the attribute of the annotator 15.

The third_1 embodiment and/or the third_2 embodiment may be applied, and the evaluation information may be derived based on the reference history information 90, the operation history information 100 or 105, and the attribute information 110.

The attribute information 110 is transmitted from the annotator terminal 11, but is not limited thereto. For example, the storage 50 of the information processing server 10 stores the attribute information 110 for each annotator identification data (ID) for identifying the annotator 15. Then, the annotator ID is transmitted from the annotator terminal 11. The information processing server 10 reads from the storage 50 and acquires the attribute information 110 corresponding to the annotator ID transmitted from the annotator terminal 11.

The busyness may be derived from an attendance table, a schedule table, or the like of the annotator 15. For example, it is determined to be busy in a case where the annotator has left work after 21:00 on two consecutive days, and it is determined to be idle in a case where the annotator has left work at a fixed time. Alternatively, it is determined that the annotator is busy in a week with a regular meeting, a lecture, an academic conference, or the like.

A specialized field of the annotator 15 may be included in the attribute information 110. In this case, for example, in a case where the task has the content related to the specialized field, the evaluation level is increased by +1. Furthermore, the attribute information may include the number of published papers by the annotator 15. In this case, the evaluation level is increased by +1 in a case where the number of published papers is greater than or equal to a first threshold value, and the evaluation level is decreased by −1 in a case where the number of published papers is smaller than a second threshold value.

18

Fifth Embodiment

Figure 20:
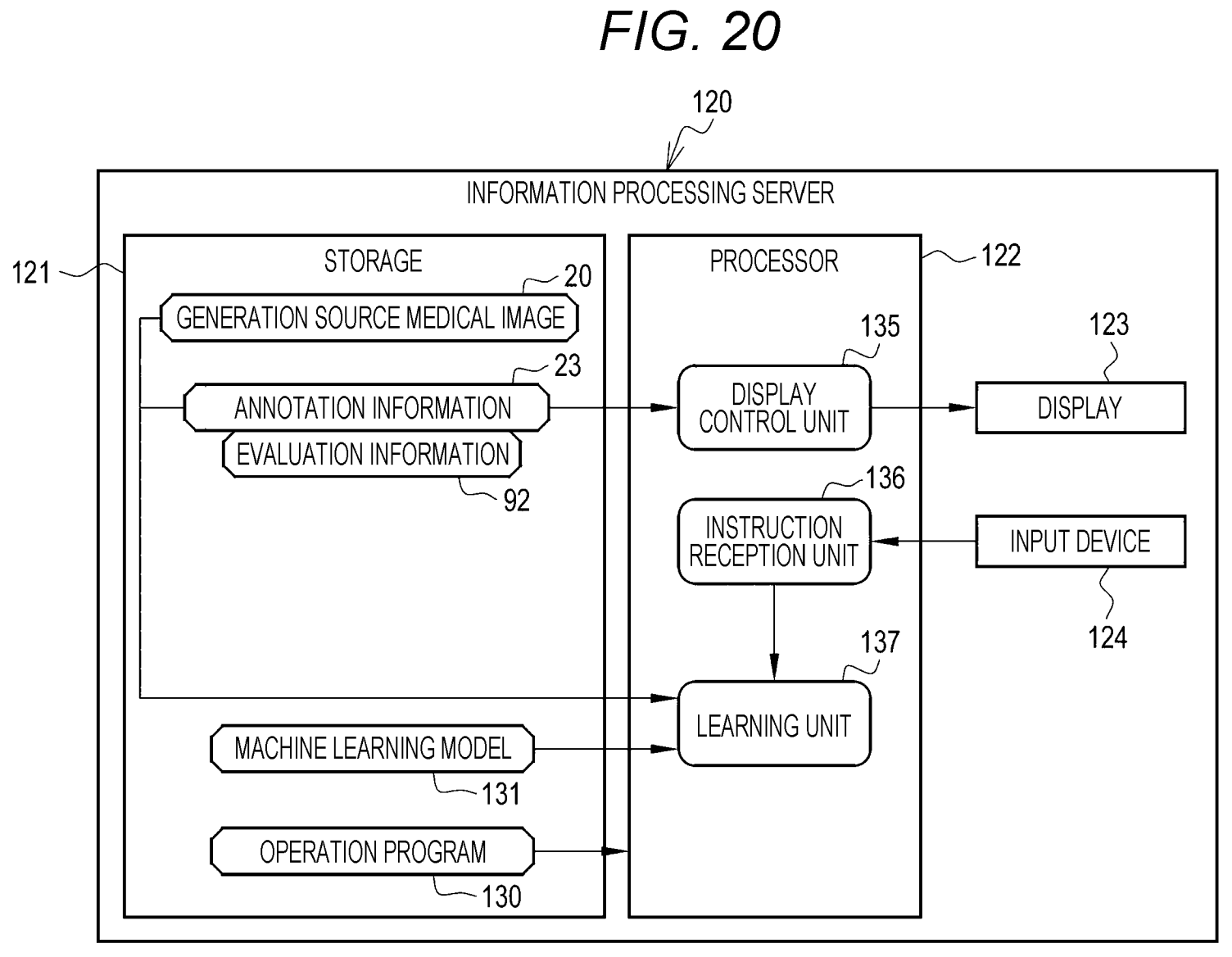

For example, as illustrated in FIG. 20, an information processing server 120 of the present embodiment includes a storage 121, a processor 122, a display 123, and an input device 124. The storage 121 stores a machine learning model 131 in addition to the generation source medical image 20, the annotation information 23, the evaluation information 92, and an operation program 130 (the related medical information 21, the reference history information 90, and the like are not illustrated). Note that the evaluation information 92 may be the evaluation information 102 or the evaluation information 112.

In a case where the operation program 130 is activated, the processor 122 cooperates with a memory (not illustrated) or the like to function as a display control unit 135, an instruction reception unit 136, and a learning unit 137 in addition to the processing units 65 to 68 (not illustrated) according to the first embodiment.

The annotation information 23 and the evaluation information 92 are input to the display control unit 135. The display control unit 135 controls display on the display 123 of a correct answer data selection screen 140 (see FIG. 21) based on the annotation information 23 and the evaluation information 92. The instruction reception unit 136 receives a correct answer data selection instruction through the correct answer data selection screen 140 by the input device 124. The learning unit 137 provides the generation source medical image 20 and the annotation information 23 selected on the correct answer data selection screen 140 to the machine learning model 131 as correct answer data, and trains the machine learning model 131.

Figure 21:
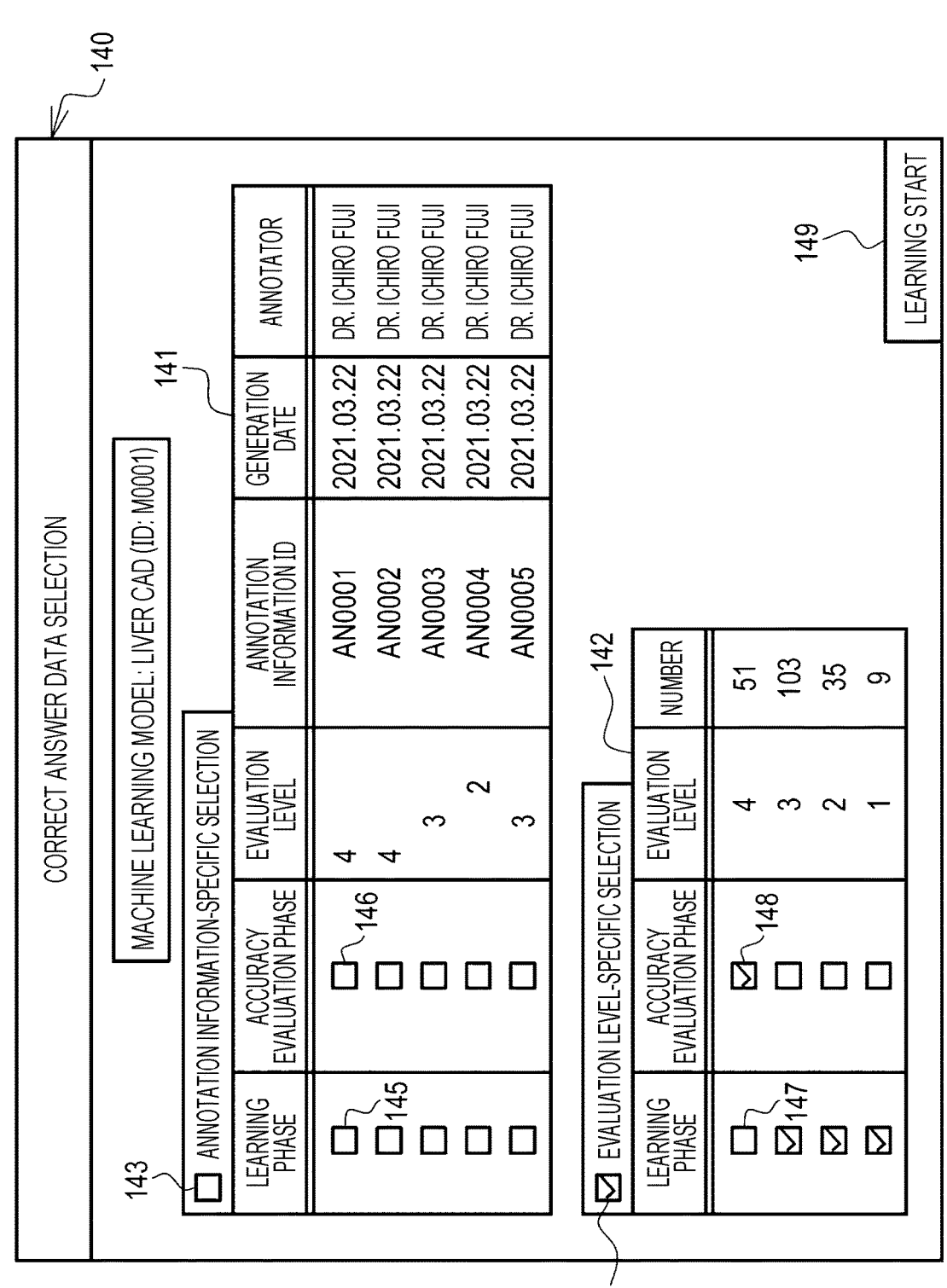
FIG. 21 is a diagram illustrating a correct answer data selection screen.

As an example, as illustrated in FIG. 21, the correct answer data selection screen 140 displayed on the display 123 under the control of the display control unit 135 includes an annotation information-specific selection unit 141 and an evaluation level-specific selection unit 142. The annotation information-specific selection unit 141 and the evaluation level-specific selection unit 142 are provided with check boxes 143 and 144 for alternatively selecting one of the selection units 141 and 142.

The evaluation level, the annotation information ID, the generation date, and the name of the annotator 15 of each piece of the annotation information 23 are listed in the annotation information-specific selection unit 141. Furthermore, the annotation information-specific selection unit 141 is provided with check boxes 145 and 146 for selecting whether to be used in the learning phase of the machine learning model 131 or to be used in the accuracy evaluation phase for each annotation information 23. The annotation information-specific selection unit 141 can be displayed by scrolling up and down.

The number of pieces of the annotation information 23 at each evaluation level is listed in the evaluation level-specific selection unit 142. Furthermore, the evaluation level-specific selection unit 142 is provided with check boxes 147 and 148 for selecting whether to be used in the learning phase of the machine learning model 131 or to be used in the accuracy evaluation phase for each evaluation level. Note that the number of pieces of referenced related medical information corresponding to each evaluation level may be displayed in the evaluation level-specific selection unit 142.

A development user of the machine learning model 131 selects the annotation information 23 to be used as the correct answer data in the learning phase and the accuracy evaluation phase of the machine learning model 131 by appropriately selecting the check boxes 143 to 148 of the correct answer data selection screen 140. After selection of the annotation information 23, the development user of the machine learning model 131 selects a learning start button 149 disposed at a lower right of the correct answer data selection screen 140. Accordingly, a correct answer data selection instruction is received by the instruction reception unit 136.

FIG. 21 illustrates a case where the check box 144 of the evaluation level-specific selection unit 142 is selected. Furthermore, FIG. 21 illustrates a case where the annotation information 23 of which the evaluation level of the evaluation information 92 is 4 is selected for the accuracy evaluation phase, and the annotation information 23 of which the evaluation level of the evaluation information 92 is 1 to 3 is selected for the learning phase.

The instruction reception unit 136 outputs a correct answer data selection instruction to the learning unit 137. In the learning phase and the accuracy evaluation phase, the learning unit 137 provides the annotation information 23 according to the correct answer data selection instruction to the machine learning model 131 to perform learning.

As described above, in the fifth embodiment, the instruction reception unit 136 receives the selection of the annotation information 23 to be used as the correct answer data. Therefore, it is possible to give the annotation information 23 desired by the development user of the machine learning model 131 to the machine learning model 131 to train the machine learning model.

According to the annotation information-specific selection unit 141, it is possible to precisely select whether or not to use each piece of annotation information 23 as correct answer data. According to the evaluation level-specific selection unit 142, it is possible to select whether or not to use the data as correct answer data in a large grouping of evaluation level. According to the evaluation level-specific selection unit 142, it is possible to save time and effort for correct answer data selection compared with a case where selection is performed for each piece of annotation information 23 in the annotation information-specific selection unit 141.

Note that a user terminal operated by the development user of the machine learning model 131 may be provided separately from the information processing server. The machine learning model 131 is stored in a storage of the user terminal. In this case, the information processing server transmits the annotation information 23 and the evaluation information 92 serving as a generation source of the correct answer data selection screen 140 to the user terminal. The user terminal generates and displays the correct answer data selection screen 140 on the display based on the annotation information 23 and the evaluation information 92 from the information processing server. The user terminal transmits a correct answer data selection instruction indicating a selection state of the correct answer data selection screen 140 to the information processing server. The information processing server receives the correct answer data selection instruction. Then, the generation source medical image 20 and the annotation information 23 according to the correct answer data selection instruction are transmitted to the user terminal. The user terminal gives the generation source medical image 20 and the annotation information 23 from the information processing server to the machine learning model 131 for training.

The machine learning model 131 may be trained using each of the annotation information 23 of evaluation level 1, the annotation information 23 of evaluation level 2, the annotation information 23 of evaluation level 3, and the annotation information 23 of evaluation level 4 as correct answer data. In this case, among the machine learning models 131 using the annotation information 23 of each evaluation level as correct answer data, the machine learning model 131 having the highest accuracy is used in the practical phase. The reference history information corresponding to the evaluation level of the annotation information 23 used for the machine learning model 131 with the highest accuracy may be recommended to the annotator 15.

Sixth Embodiment

Figure 22:
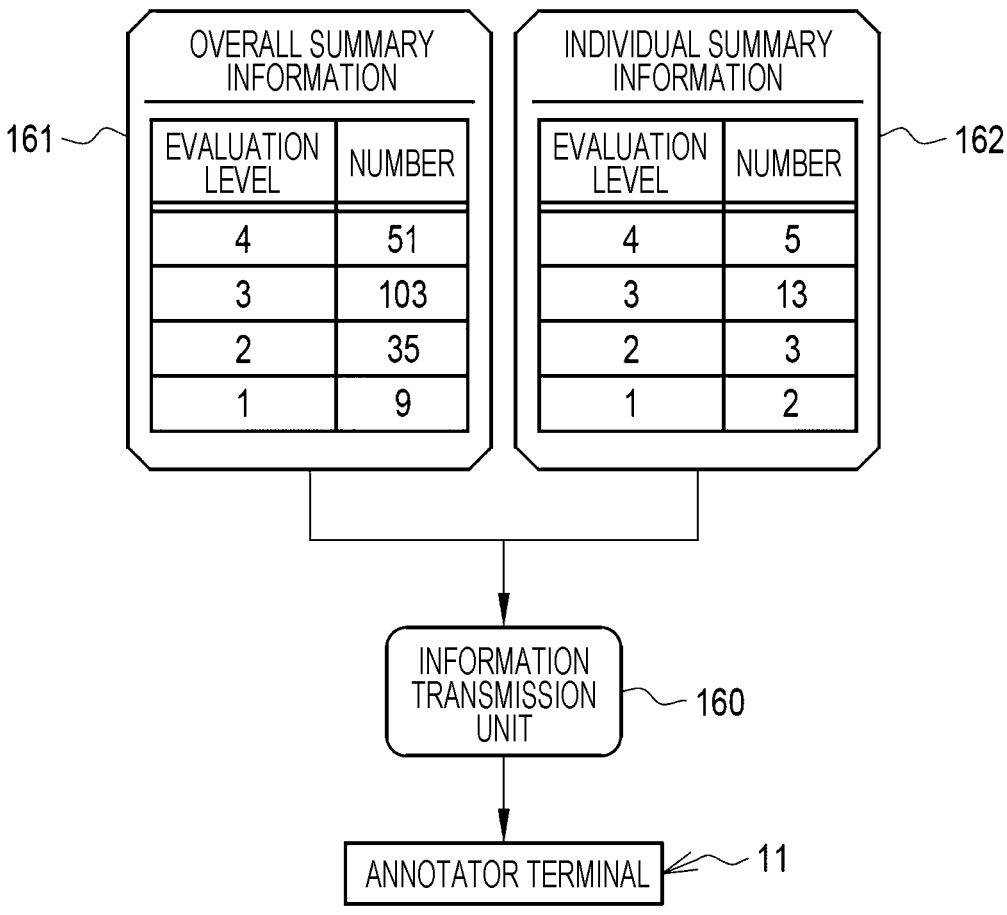
FIG. 22 is a diagram illustrating a sixth embodiment in which overall summary information and individual summary information are transmitted to an annotator terminal.

As an example, as illustrated in FIG. 22, a processor of an information processing server of the present embodiment functions as an information transmission unit 160 in addition to each of the processing units 65 to 68 (not illustrated) of the first embodiment. The information transmission unit 160 transmits overall summary information 161 and individual summary information 162 to the annotator terminal 11.

The overall summary information 161 shows a summary of the evaluation information 92 of all the annotation information 23 generated to be used as correct answer data of a certain machine learning model. The individual summary information 162 indicates a summary of the evaluation information 92 of the annotation information 23 generated by the annotator 15 of the annotator terminal 11 that is a transmission destination of the individual summary information 162 among the annotation information 23 generated to be used as correct answer data of a certain machine learning model. Specifically, the overall summary information 161 and the individual summary information 162 are information in which the number of cases of the annotation information 23 is registered for each evaluation level of the evaluation information 92. In other words, the overall summary information 161 and the individual summary information 162 are statistical information on the number of cases of the annotation information 23. Note that the evaluation information 92 may be the evaluation information 102 or the evaluation information 112.

Figures 23, 24:
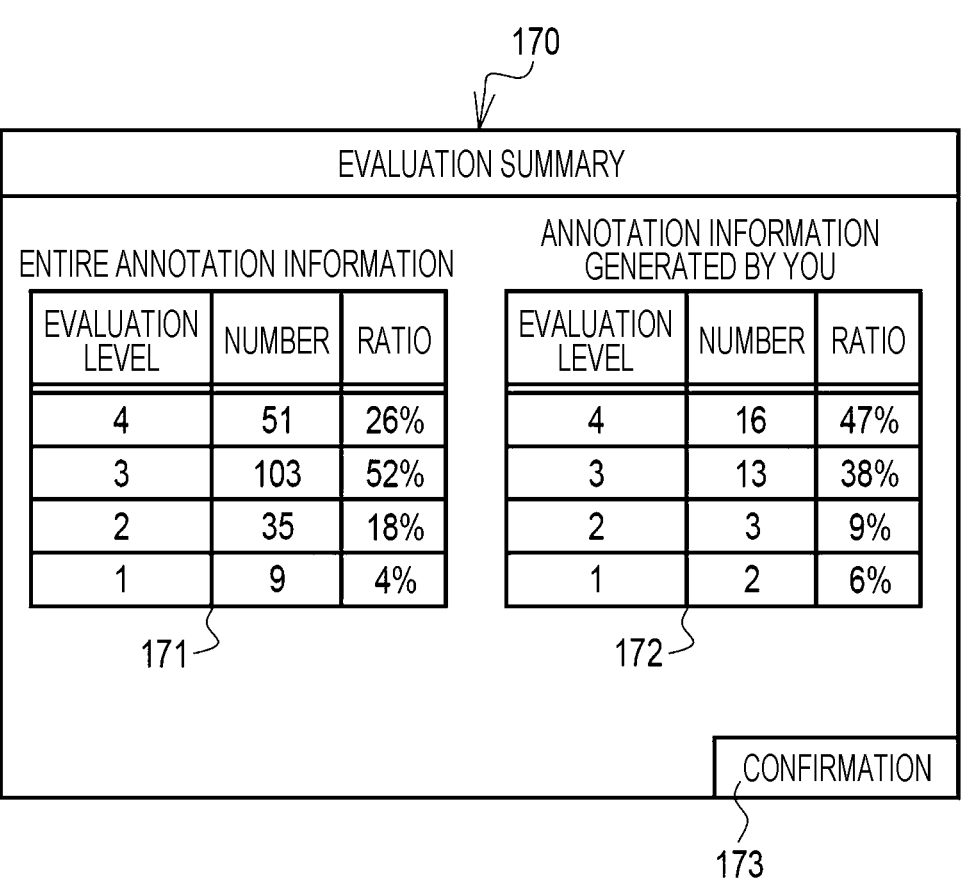
FIG. 23 is a diagram illustrating an evaluation summary display screen.
FIG. 24 is a diagram illustrating another example of the individual summary information.

In the annotator terminal 11 that has received the overall summary information 161 and the individual summary information 162, an evaluation summary display screen 170 illustrated in FIG. 23 as an example is displayed on the display 13. The evaluation summary display screen 170 has an overall summary information display region 171 and an individual summary information display region 172. In the overall summary information display region 171, the overall summary information 161 and the ratio of the number of cases of annotation information 23 for each evaluation level are displayed. In the individual summary information display region 172, the individual summary information 162 and the ratio of the number of cases of the annotation information 23 for each evaluation level are displayed. The display of the evaluation summary display screen 170 is erased in a case where a confirmation button 173 disposed at a lower right is selected.

As described above, in the sixth embodiment, the information transmission unit 160 transmits the overall summary information 161 indicating the summary of the evaluation information 92 of all the annotation information 23 and the individual summary information 162 indicating the summary of the evaluation information 92 of the annotation information 23 generated by the individual annotator 15 to the annotator terminal 11 operated by the annotator 15. Therefore, the annotator 15 can compare a difference in the evaluation information 92 between the whole and the annotator 15 themselves. For example, in a case where the ratio between the evaluation levels 4 and 3 of the individual summary information 162 is higher than the ratio between the evaluation levels 4 and 3 of the overall summary information 161, it can be seen that the annotation information 23 generated by the annotator is relatively highly evaluated, and it can be confirmed that the way of assigning the label of the annotator is not so off-target. Note that not only both the overall summary information 161 and the individual summary information 162 but also at least one of the overall summary information 161 or the individual summary information 162 may be transmitted to the annotator terminal 11.

Figure 25:
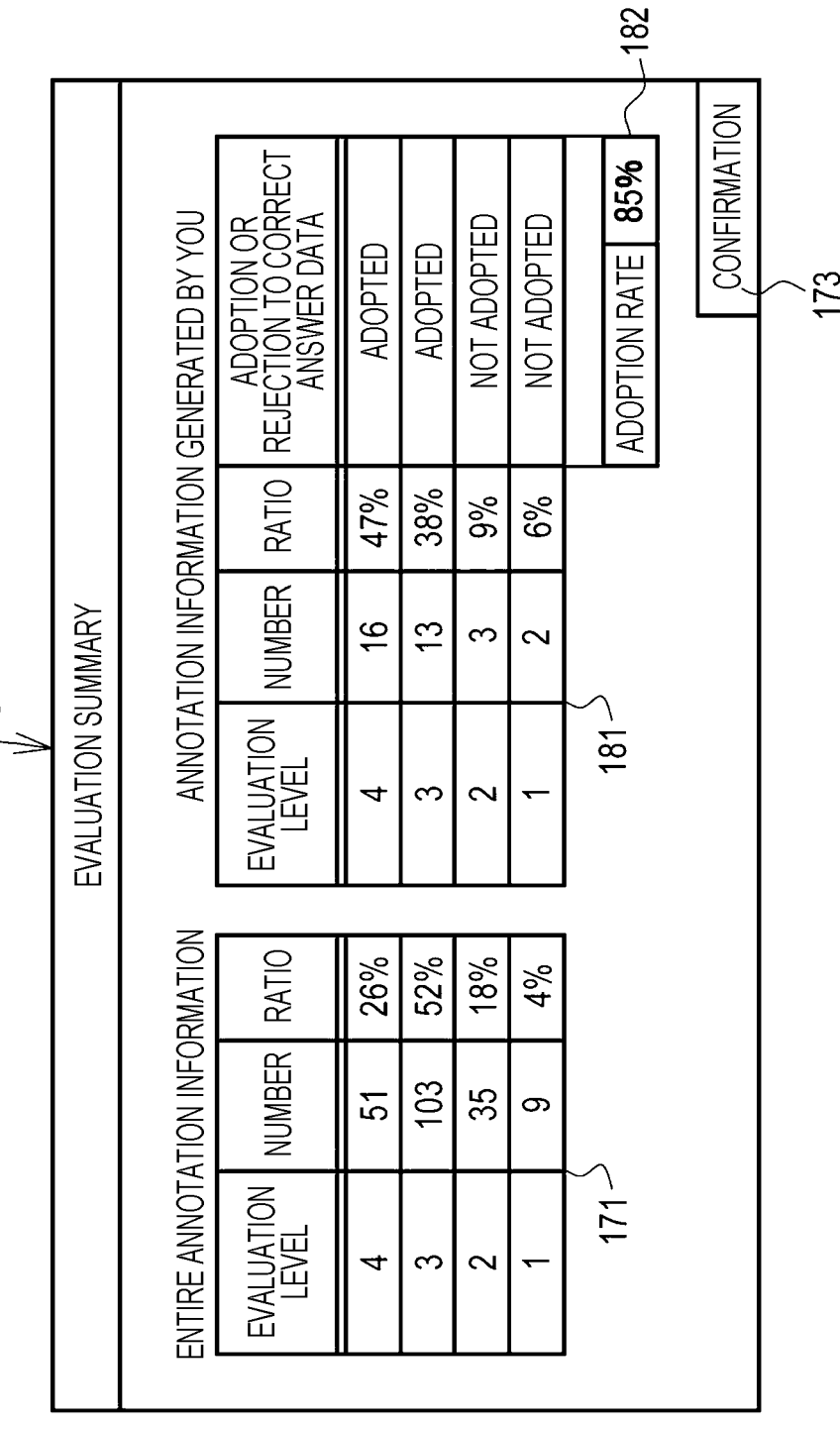
FIG. 25 is a diagram illustrating another example of the evaluation summary display screen.

Note that, as in individual summary information 175 illustrated in FIG. 24 as an example, the adoption or rejection of the annotation information 23 to the correct answer data may be registered for each evaluation level of the evaluation information 92. In this case, as an example, as in an evaluation summary display screen 180 illustrated in FIG. 25, whether or not to adopt to the correct answer data is displayed in an individual summary information display region 181. Furthermore, an adoption rate display region 182 is provided below the individual summary information display region 181 to display an adoption rate. The adoption rate is obtained by dividing the number of pieces of the annotation information 23 adopted in the correct answer data by the total number of pieces of the annotation information 23 generated by the annotator 15 of the annotator terminal 11 that is a transmission destination of the individual summary information 175. In this way, by transmitting the individual summary information 175 in which the adoption or rejection of the annotation information 23 as the correct answer data is registered to the annotator terminal 11, the annotator 15 can know to what extent the annotation information 23 generated by the annotator 15 is adopted as the correct answer data.

Note that, at least one of the calculations of the ratio of the annotation information 23 for each evaluation level or the adoption rate may be performed by at least one of the information processing server 120 or the annotator terminal 11. As the ratio, the ratio of the annotation information 23 associated with the whole or each annotator 15 to the whole is exemplified, but the present disclosure is not limited thereto. For example, the ratio may indicate a ratio of individual pieces of annotation information 23 to all pieces of annotation information 23. For example, in the case of the evaluation level 4, since the number of cases of all the annotation information 23 is 51 and the number of cases generated by the target annotator 15 is 16,16/51=31% becomes the ratio of each annotation information 23 to all the annotation information 23.

Seventh Embodiment

Figure 26:
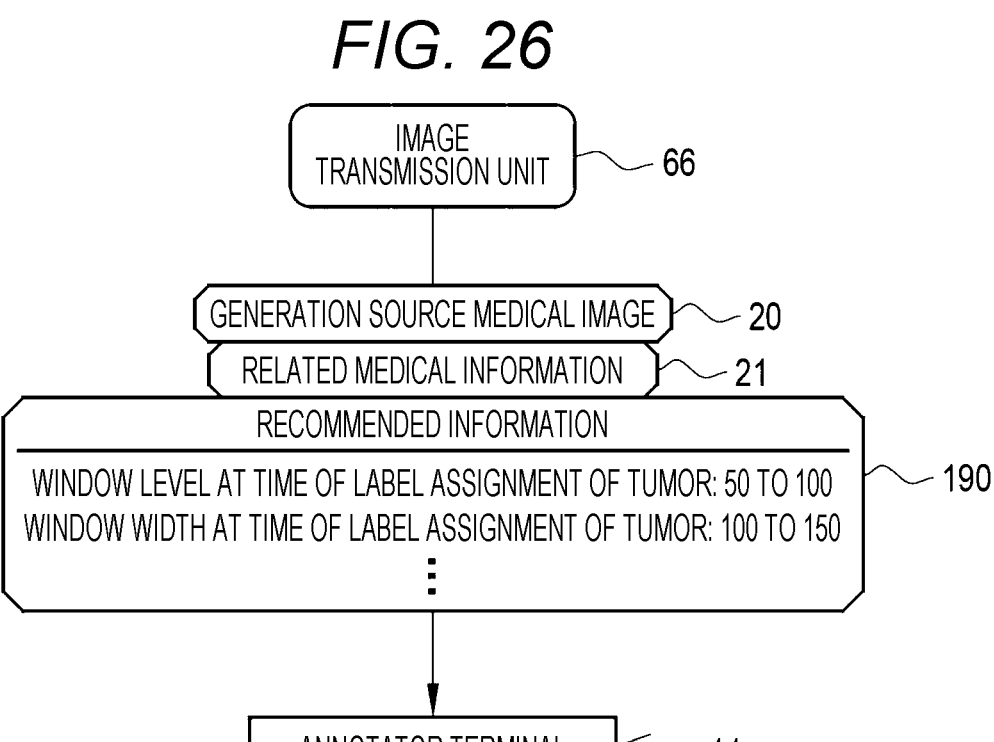
FIG. 26 is a diagram illustrating a seventh embodiment in which a generation source medical image, related medical information, and recommended information are transmitted to an annotator terminal.

As an example, as illustrated in FIG. 26, the image transmission unit 66 of the present embodiment retransmits the generation source medical image 20 and the related medical information 21 to the annotator terminal 11 of the annotator 15 that has generated the annotation information 23 of which the evaluation of the quality is relatively poor, for example, the evaluation level is 1, for the purpose of prompting correction of the annotation information 23. In this case, the image transmission unit 66 attaches recommended information 190. The recommended information 190 stores a matter to be implemented by the annotator 15 to increase the evaluation level. Specifically, in the recommended information 190, a recommended range of a window level and a window width at the time of label assignment of each class is stored.

In the annotator terminal 11 that has received the generation source medical image 20, the related medical information 21, and the recommended information 190, an annotation information generation screen including a message prompting the correction of the annotation information 23 and the recommended information 190 is displayed on the display 13.

As described above, in the seventh embodiment, the annotator 15 is prompted to correct the annotation information 23 having a relatively low quality evaluation. In this case, the recommended information 190 is attached, and the evaluation of the quality of the corrected annotation information 23 is increased. Therefore, it is possible to effectively correct the annotation information 23 having a relatively low quality evaluation to the annotation information 23 having a high quality.

The recommended information 190 may include a precaution that least two or more kinds of related medical information 21 are referred to. Furthermore, when the generation source medical image 20 and the related medical information 21 are transmitted to the annotator terminal 11 in order to request the generation of the annotation information 23 for the first time, the recommended information 190 may be transmitted together.

Furthermore, the annotator terminal 11 may display the related medical information 21 in parallel with the recommended information 190. For example, in a case where the annotator terminal 11 receives the recommended information 190 including a precaution to refer to two or more types of related medical information 21, when the generation end button 38 is operated, it is determined whether or not the number of types of related medical information 21 referred to so far is two or more, and in a case where the number of types of related medical information 21 referred to is not two or more, the display of the related-medical-information display region 40 may be automatically switched to forcibly direct the annotator 15 to refer to two or more types of related medical information 21.

In the first embodiment, the generation source medical image 20 and the related medical information 21 are transmitted from the information processing server 10 to the annotator terminal 11, but the present disclosure is not limited thereto. For example, an image management server that accumulates and manages the generation source medical image 20 and a related medical information management server that accumulates and manages the related medical information 21 may be provided separately from the information processing server 10, and the generation source medical image 20 and the related medical information 21 may be transmitted to the annotator terminal 11 from the image management server and the related medical information management server.

The generation source medical image 20 is not limited to the abdominal tomographic image captured by the illustrated CT apparatus. For example, a head tomographic image captured by a magnetic resonance imaging (MRI) apparatus may be used. Furthermore, the medical image is not limited to a three-dimensional image such as a tomographic image. For example, a two-dimensional image such as a simple radiographic image may be used. The medical image may be a positron emission tomography (PET) image, a single photon emission computed tomography (SPECT) image, an endoscopic image, an ultrasound image, a funduscopy image, and the like.

Figure 27:
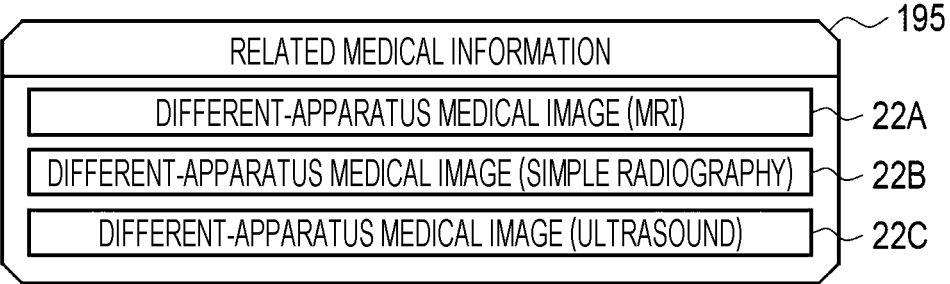
FIG. 27 is a diagram illustrating related medical information including a plurality of types of different-apparatus medical images.

Similarly, the different-apparatus medical image 22 is not limited to the abdominal tomographic image captured by the exemplified MRI apparatus. Furthermore, as in related medical information 195 illustrated in FIG. 27 as an example, there may be a plurality of types of different-apparatus medical images 22. In this case, type information of the medical image capturing apparatus is attached to the different-apparatus medical image 22. FIG. 27 illustrates the different-apparatus medical image 22A captured by the MRI apparatus, the different-apparatus medical image 22B captured by the simple radiography apparatus, and the different-apparatus medical image 22C captured by the ultrasound imaging apparatus.

The count number of the related medical information referred to by the annotator 15 may be changed according to the type of the medical image capturing apparatus for the different-apparatus medical image 22. For example, the count number in a case where the different-apparatus medical image 22A captured by the MRI apparatus is referred to is set as 1, and the count number in a case where the different-apparatus medical image 22B captured by the simple radiography apparatus and the different-apparatus medical image 22C captured by the ultrasound imaging apparatus are referred to is set as 0.5. In this way, it is possible to distinguish the different-apparatus medical image 22 having a relatively high degree of contribution to the generation of the annotation information 23 from the different-apparatus medical image 22 having a relatively low degree of contribution to the generation of the annotation information 23.

Figure 28:
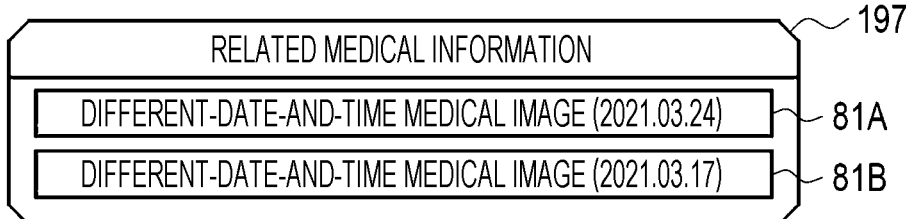
FIG. 28 is a diagram illustrating related medical information including a plurality of types of different-date-and-time medical images.

As an example, as in related medical information 197 illustrated in FIG. 28, there may be a plurality of the different-date-and-time medical images 81. In this case, information of the imaging date and time is attached to each of the different-date-and-time medical images 81. In FIG. 28, a different-date-and-time medical image 81A captured on Mar. 24, 2021, and a different-date-and-time medical image 81B captured on Mar. 17, 2021, which was one week before that, are illustrated.

Similar to the case of the different-apparatus medical image 22, the count number of the number of pieces of related medical information referred to by the annotator 15 may be changed according to the imaging date and time of the different-date-and-time medical images 81. For example, the count number in a case where the different-date-and-time medical image 81A captured most recently is referred to is set as 1, and the count number in a case where the different-date-and-time medical image 81B captured one week before the different-date-and-time medical image 81A is referred to is set as 0.5. In this way, it is possible to distinguish the different-date-and-time medical image 81 having a relatively high degree of contribution to the generation of the annotation information 23 from the different-date-and-time medical image 81.

The class to which the label is assigned is also not limited to the exemplified liver, tumor, and bleeding. The anatomical regions may include other organs such as a brain, eyes, a spleen, and a kidney, bones such as the vertebrae and the ribs, anatomical regions of organs such as the S1 to S10 of the lungs, the pancreatic head, pancreatic body, and the pancreas tail of the pancreas, and other abnormal finding regions such as the cyst, atrophy, stenosis of the duct, or dilation of the duct. Furthermore, a pacemaker, an artificial joint, a bolt for fracture treatment, and the like may be used. Moreover, labels of different classes may be assigned to the same region, such as assigning two labels of tumor and bleeding to a bleeding site of the tumor.

Although the labels are assigned in units of pixels of the generation source medical image 20, the present disclosure is not limited thereto. For example, a label may be assigned to a rectangular frame (in a case where the generation source medical image 20 is a two-dimensional image) or box-shaped frame (in a case where the generation source medical image 20 is a three-dimensional image) surrounding the entire class such as a tumor.

The label may not be assigned to the region of the generation source medical image 20, and may be assigned to the generation source medical image 20 itself. For example, the presence or absence of the development of dementia is assigned as a label to the head tomographic image captured by the MRI apparatus.

Various screens such as the annotation information generation screen 30A may be transmitted from the information processing server 10 or 120 to the annotator terminal 11 in the form of a screen for web distribution created in a markup language such as Extensible Markup Language (XML). In this case, the annotator terminal 11 reproduces various screens to be displayed on a web browser based on the screen data and displays the various screens on the display 13. Note that, instead of XML, another data description language such as JavaScript (registered trademark) Object Notation (JSON) may be used.

As described above, in a case where the screen data such as the annotation information generation screen 30A is transmitted from the information processing server 10 or 120 to the annotator terminal 11, the operation history information 100 and 105 of the third_1 embodiment may be generated on a side of the information processing server 10 or 120.

Various modifications are possible for a hardware configuration of the computer constituting the information processing server 10. For example, the information processing server 10 may be configured by a plurality of server computers separated as hardware for the purpose of improving processing capability and reliability. For example, the functions of the RW control unit 65, the image transmission unit 66, and the information reception unit 67 and the functions of the derivation unit 68 are distributed to two server computers. In this case, the information processing server 10 is composed of two server computers. The annotator terminal 11 may take charge of some or all of the functions of the processing units 65 to 68 of the information processing server 10.

As described above, the hardware configuration of the computer of the information processing server 10 can be appropriately changed according to required performance such as processing capability, safety, and reliability. Moreover, it is needless to say that not only the hardware but also the AP such as the operation program 60 can be duplicated or distributed and stored in a plurality of storages for a purpose of ensuring safety and reliability.

In each of the above-described embodiments, for example, the following various processors can be used as the hardware structure of processing units performing various processes, such as the RW control unit 65, the image transmission unit 66, the information reception unit 67, the derivation unit 68, the display control unit 135, the instruction reception unit 136, the learning unit 137, and the information transmission unit 160. The various processors include a CPU that is a general-purpose processor executing software (the operation program 60 or 130) to function as various processing units, a programmable logic device (PLD) that is a processor capable of changing a circuit configuration after manufacture, such as a field-programmable gate array (FPGA), and/or a dedicated electric circuit that is a processor having a circuit configuration exclusively designed to execute specific processing, such as an application-specific integrated circuit (ASIC).

One processing unit may be configured by one of these various processors, or may be configured by a combination of two or more processors of the same type or different types (for example, a combination of a plurality of FPGAs and/or a combination of a CPU and an FPGA). Furthermore, the plurality of processing units may be configured by one processor.

As an example in which the plurality of processing units are configured by one processor, first, as represented by a computer such as a client and a server, there is a form in which one processor is configured by a combination of one or more CPUs and software and this processor functions as the plurality of processing units. Second, as represented by a System-on-Chip (SoC) or the like, there is a form in which a processor that realizes the functions of the entire system including a plurality of processing units with one integrated circuit (IC) chip is used. As described above, the various processing units are configured using one or more of the various processors as a hardware structure.

More specifically, an electric circuit (circuitry) in which circuit elements such as semiconductor elements are combined can be used as the hardware structure of the various processors.

[Supplementary Note 1]

It is Preferable that the Evaluation Information has a Higher Evaluation of the Quality when the annotator refers to the related medical information than when the annotator does not refer to the related medical information.

[Supplementary Note 2]

It is preferable that the related medical information includes at least a different-apparatus medical image captured by a medical image capturing apparatus different from the generation source medical image.

[Supplementary Note 3]

It is preferable that there are a plurality of types of the related medical information, and the processor derives the evaluation information according to a number of the related medical information referred to by the annotator among the plurality of types of the related medical information.

[Supplementary Note 4]

It is preferable that the processor acquires operation history information of the annotator with respect to at least one of the generation source medical image or the related medical information when the annotation information is generated, and derives the evaluation information based on the operation history information in addition to the reference history information.

[Supplementary Note 5]

It is preferable that the operation history information is information related to at least one of an enlargement operation or a display gradation change operation.

[Supplementary Note 6]

It is preferable that the processor acquires attribute information of the annotator, and derives the evaluation information based on the attribute information in addition to the reference history information.

[Supplementary Note 7]

It is preferable that the processor receives selection of the annotation information to be used as the correct answer data.

[Supplementary Note 8]

It is preferable that the processor transmits to an annotator terminal operated by the annotator at least one of overall summary information indicating a summary of the evaluation information of all the annotation information or individual summary information indicating a summary of the evaluation information of the annotation information generated by each of the annotators.

In the technique of the present disclosure, the above-described various embodiments and/or various modification examples can be appropriately combined. Furthermore, it is needless to say that the present disclosure is not limited to each of the above-described embodiments and various configurations can be adopted without departing from the scope of the present disclosure. Moreover, the technique of the present disclosure extends to a storage medium that non-transitorily stores a program in addition to the program.

The contents described and illustrated above are detailed descriptions of portions according to the technique of the present disclosure and are merely examples of the technique of the present disclosure. For example, the above description of the configurations, functions, actions, and effects is an example of the configurations, functions, actions, and effects of the portions according to the technique of the present disclosure. Accordingly, it goes without saying that unnecessary portions may be deleted, new elements may be added, or replacement may be made with respect to the described contents and the illustrated contents described above without departing from the scope of the technique of the present disclosure. Furthermore, in order to avoid complication and to facilitate understanding of portions according to the technique of the present disclosure, description related to common technical knowledge or the like that does not need to be particularly described for enabling implementation of the technique of the present disclosure is omitted in the description contents and the illustration contents described above.

In the present specification, "A and/or B" has the same meaning as "at least one of A or B". That is, "A and/or B" means that only A may be used, only B may be used, or a combination of A and B may be used. Furthermore, in the present specification, in a case where three or more matters are expressed by being connected by "and/or", the same concept as "A and/or B" is applied.

All documents, patent applications, and technical standards described in this specification are herein incorporated by reference to the same extent as if each individual publication, patent application, or technical standard was specifically and individually indicated to be incorporated by reference.

What is claimed is:

1. An information processing apparatus comprising:
   a processor,
   wherein the processor
   acquires, when an annotator generates annotation information as correct answer data of a machine learning model for analyzing a medical image, the processor, reference history information by the annotator of related medical information related to a generation source medical image that is a generation source of the annotation information, and
   derives evaluation information representing quality of the annotation information based on the reference history information.

2. The information processing apparatus according to claim 1,
   wherein the evaluation information has a higher evaluation of the quality when the annotator refers to the related medical information than when the annotator does not refer to the related medical information.

3. The information processing apparatus according to claim 1, wherein the related medical information includes at least a different-apparatus medical image captured by a medical image capturing apparatus different from the generation source medical image.

4. The information processing apparatus according to claim 1, wherein there are a plurality of types of the related medical information, and the processor derives the evaluation information according to the number of the related medical information referred to by the annotator among the plurality of types of the related medical information.

5. The information processing apparatus according to claim 1, wherein the processor acquires operation history information of the annotator with respect to at least one of the generation source medical image or the related medical information when the annotation information is generated, and derives the evaluation information based on the operation history information in addition to the reference history information.

6. The information processing apparatus according to claim 5, wherein the operation history information is information related to at least one of an enlargement operation or a display gradation change operation.

7. The information processing apparatus according to claim 1, wherein the processor acquires attribute information of the annotator, and derives the evaluation information based on the attribute information in addition to the reference history information.

8. The information processing apparatus according to claim 1, wherein the processor receives selection of the annotation information to be used as the correct answer data.

9. The information processing apparatus according to claim 1, wherein the processor transmits to an annotator terminal operated by the annotator at least one of overall summary information indicating a summary of the evaluation information of all the annotation information or individual summary information indicating a summary of the evaluation information of the annotation information generated by each of the annotators.

10. A method of operating an information processing apparatus, the method comprising:

acquiring, when an annotator generates annotation information as correct answer data of a machine learning model for analyzing a medical image, reference history information by the annotator of related medical information related to a generation source medical image that is a generation source of the annotation information; and deriving evaluation information representing quality of the annotation information based on the reference history information.

11. A non-transitory computer-readable storage medium storing a program for operating an information processing apparatus, the program causing a computer to execute processing of:

acquiring, when an annotator generates annotation information as correct answer data of a machine learning model for analyzing a medical image, acquiring reference history information by the annotator of related medical information related to a generation source medical image that is a generation source of the annotation information; and deriving evaluation information representing quality of the annotation information based on the reference history information.

* * * * *